(12) United States Patent
Ramun

(10) Patent No.: US 7,877,906 B2
(45) Date of Patent: *Feb. 1, 2011

(54) MODULAR SYSTEM FOR CONNECTING ATTACHMENTS TO A CONSTRUCTION MACHINE

(76) Inventor: John R. Ramun, 8243 N. Lima Rd., Poland, OH (US) 44514

( * ) Notice: Subject to any disclaimer, the term of this patent is extended or adjusted under 35 U.S.C. 154(b) by 24 days.

This patent is subject to a terminal disclaimer.

(21) Appl. No.: 12/255,314

(22) Filed: Oct. 21, 2008

(65) Prior Publication Data

US 2009/0084005 A1 Apr. 2, 2009

Related U.S. Application Data

(63) Continuation-in-part of application No. 11/331,818, filed on Jan. 13, 2006.

(51) Int. Cl.
*E02F 3/96* (2006.01)
*E02F 3/38* (2006.01)

(52) U.S. Cl. .......................................... 37/403; 414/723

(58) Field of Classification Search ........... 37/403–410, 37/466, 468, 231, 443; 172/272–275; 403/14, 403/43, 45, 339, 340, 364; 414/694, 722–724, 414/727; 241/101.72, 101.73, 266; 30/134; 144/4.1, 34.1

See application file for complete search history.

(56) References Cited

U.S. PATENT DOCUMENTS

| | | |
|---|---|---|
| 4,403,431 A | 9/1983 | Ramun et al. |
| 4,670,983 A | 6/1987 | Ramun et al. |
| 4,838,493 A | 6/1989 | LaBounty |
| 4,890,798 A | 1/1990 | Tagawa et al. |
| 4,893,493 A | 1/1990 | Jacques et al. |
| 4,897,921 A | 2/1990 | Ramun |
| 4,903,408 A | 2/1990 | Tagawa et al. |
| 4,958,981 A * | 9/1990 | Uchihashi .................. 414/694 |
| 5,044,568 A | 9/1991 | Shigemizu |
| 5,044,569 A | 9/1991 | LaBounty et al. |
| 5,060,378 A | 10/1991 | LaBounty et al. |
| 5,171,124 A * | 12/1992 | Foster ........................ 414/685 |
| 5,199,658 A | 4/1993 | Bartels et al. |
| 5,243,761 A | 9/1993 | Sullivan et al. |
| 5,359,775 A | 11/1994 | Morikawa et al. |
| 5,480,100 A | 1/1996 | Tagawa et al. |
| RE35,432 E | 1/1997 | LaBounty et al. |
| 5,626,301 A | 5/1997 | Morikawa et al. |
| 5,636,802 A | 6/1997 | Tagawa |
| 5,645,236 A | 7/1997 | Sugiura et al. |
| 5,738,289 A | 4/1998 | Tagawa |
| 5,926,958 A | 7/1999 | Ramun |
| 5,940,971 A | 8/1999 | Ramun |

(Continued)

FOREIGN PATENT DOCUMENTS

DE 4208245 A1 9/1993

(Continued)

*Primary Examiner*—Robert E Pezzuto
(74) *Attorney, Agent, or Firm*—The Webb Law Firm

(57) ABSTRACT

A modular system for connecting attachments to the extension arm of a construction machine, wherein each module has a standardized coupling arrangement. As a result, each module is compatible with another module to provide great versatility in configuring the machine. Additionally, the system includes a variety of different modules and a mechanism for remotely activating the coupling between modules.

20 Claims, 39 Drawing Sheets

U.S. PATENT DOCUMENTS 6,061,911 A    5/2000   LaBounty et al.
6,301,811 B1 * 10/2001  Gilmore, Jr. .................. 37/468
6,655,054 B1   12/2003  Ward
7,032,335 B2   4/2006   Short

FOREIGN PATENT DOCUMENTS

WO    03021047 A1    3/2003

* cited by examiner

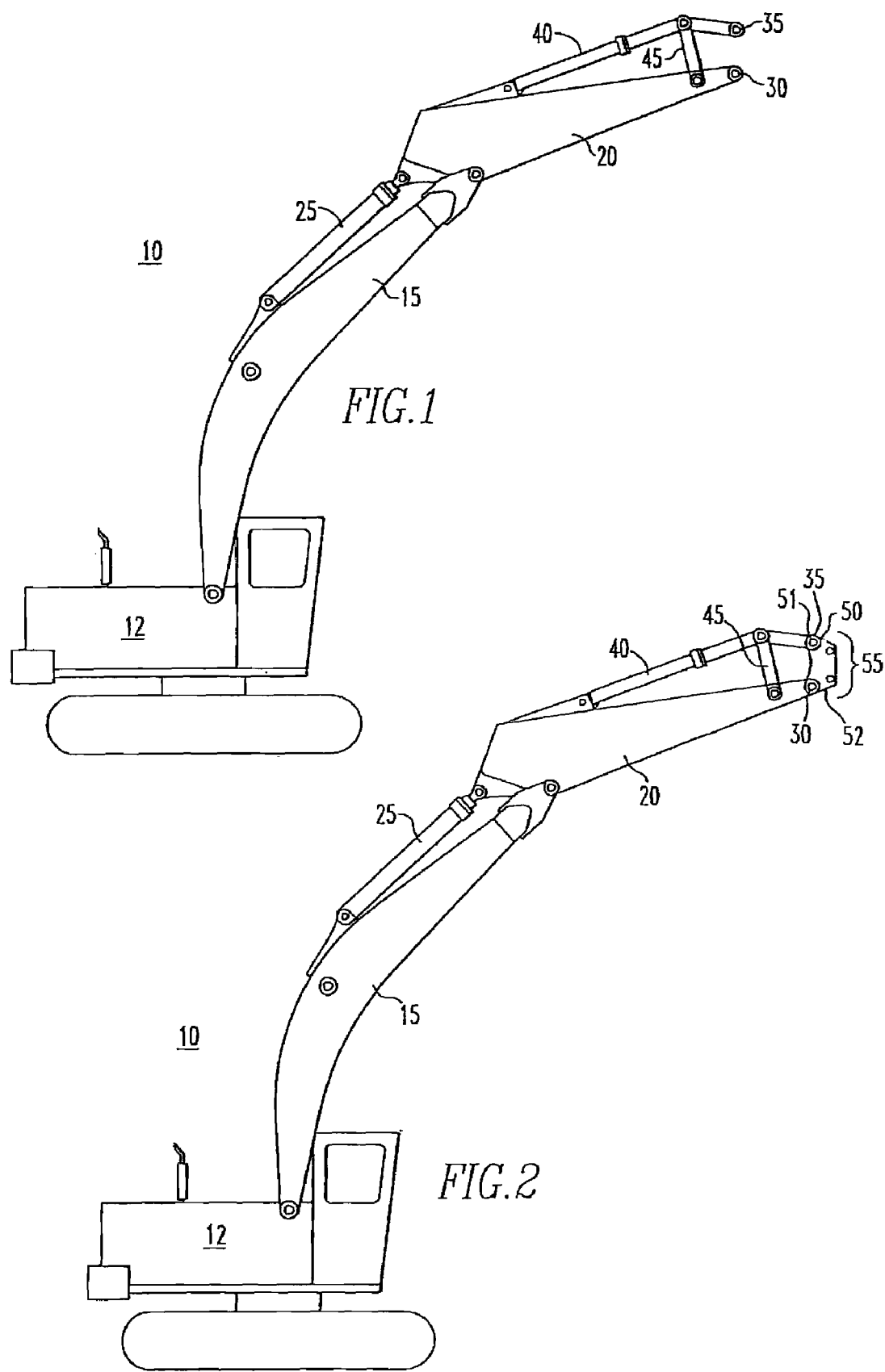

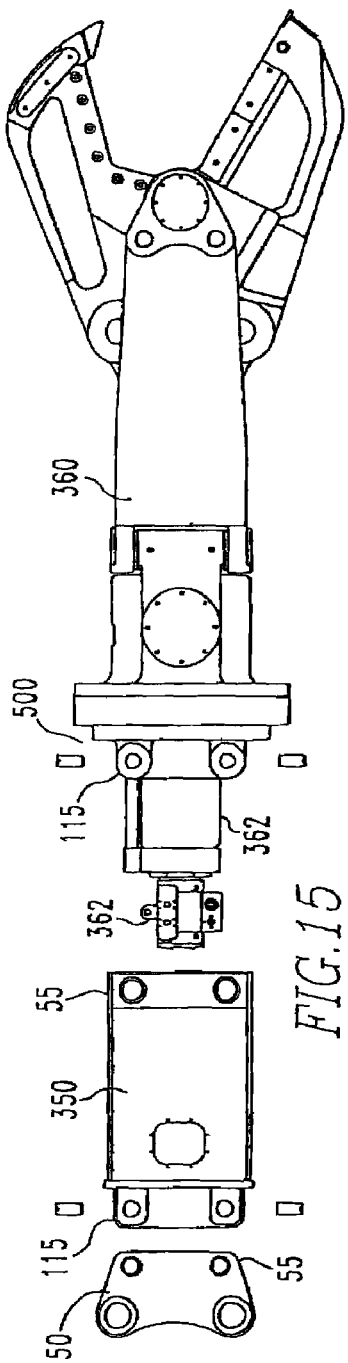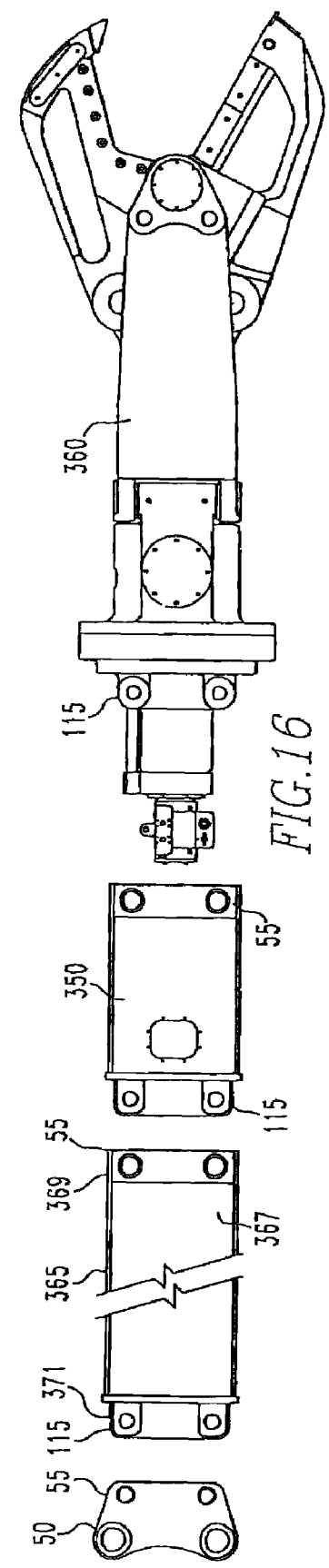

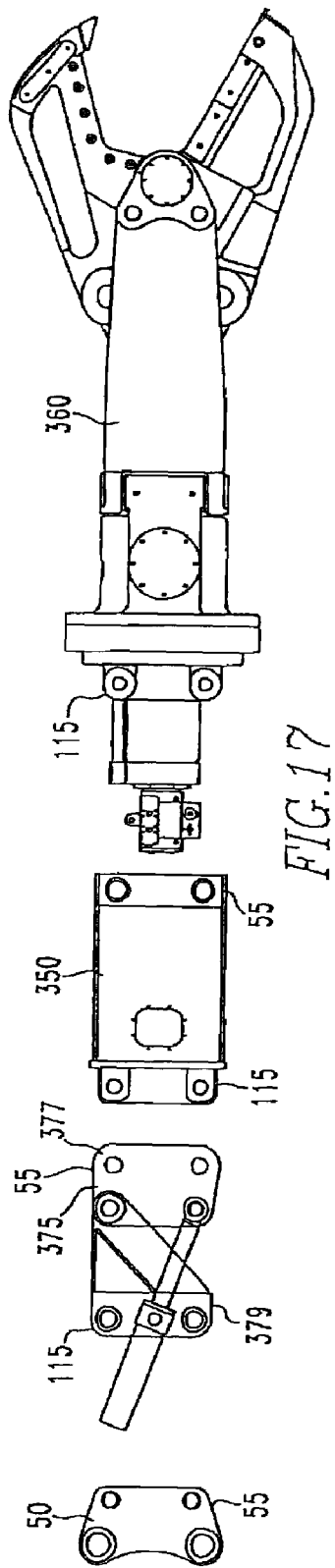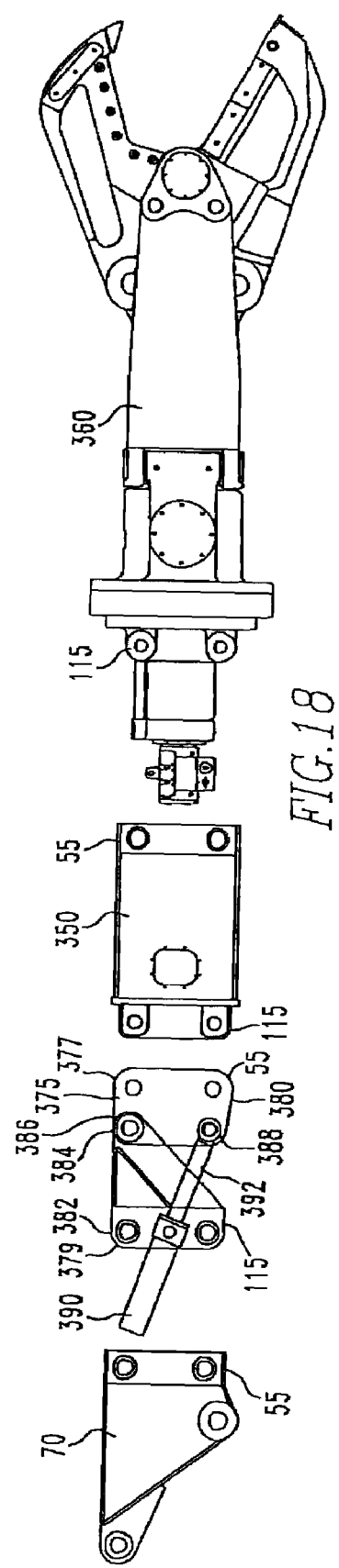

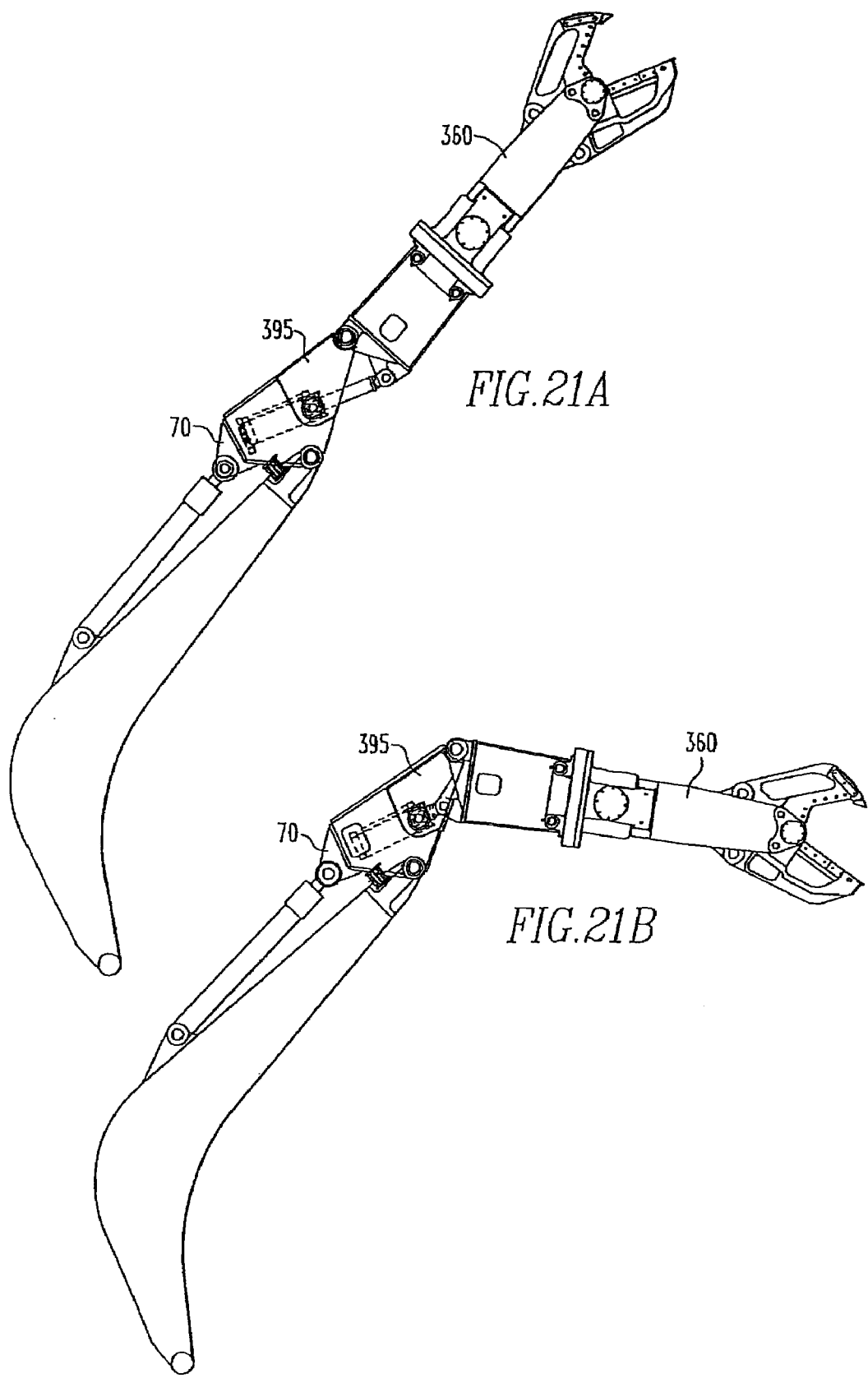

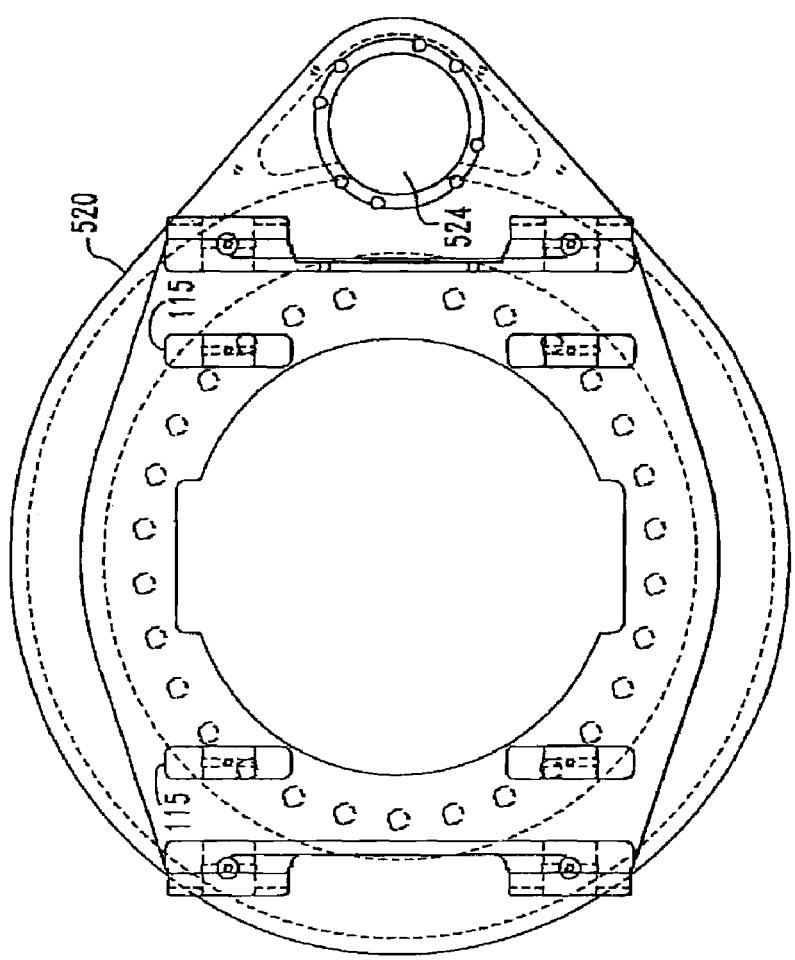
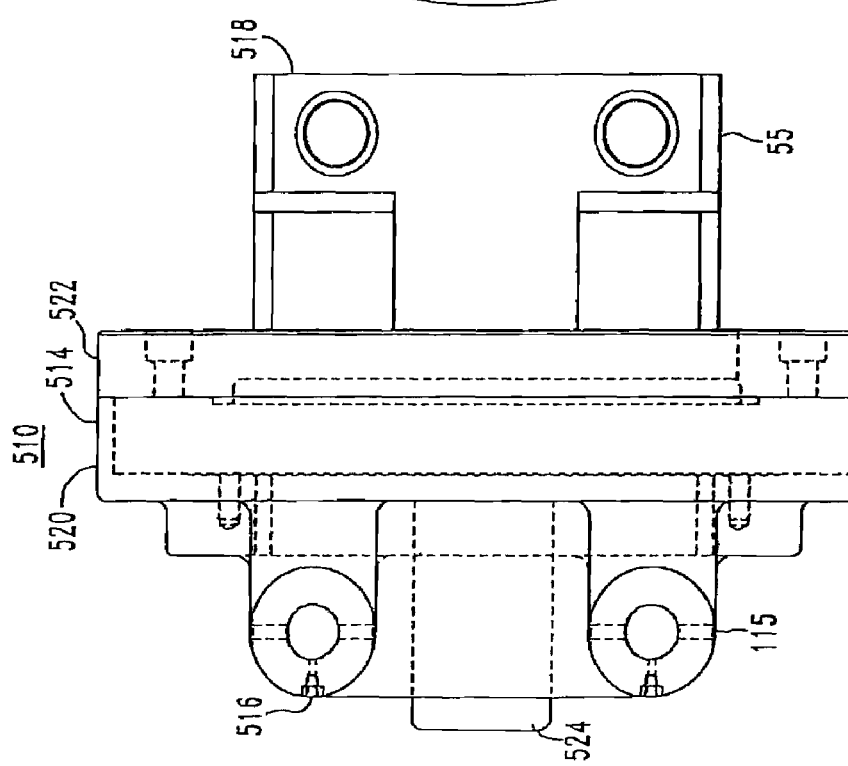

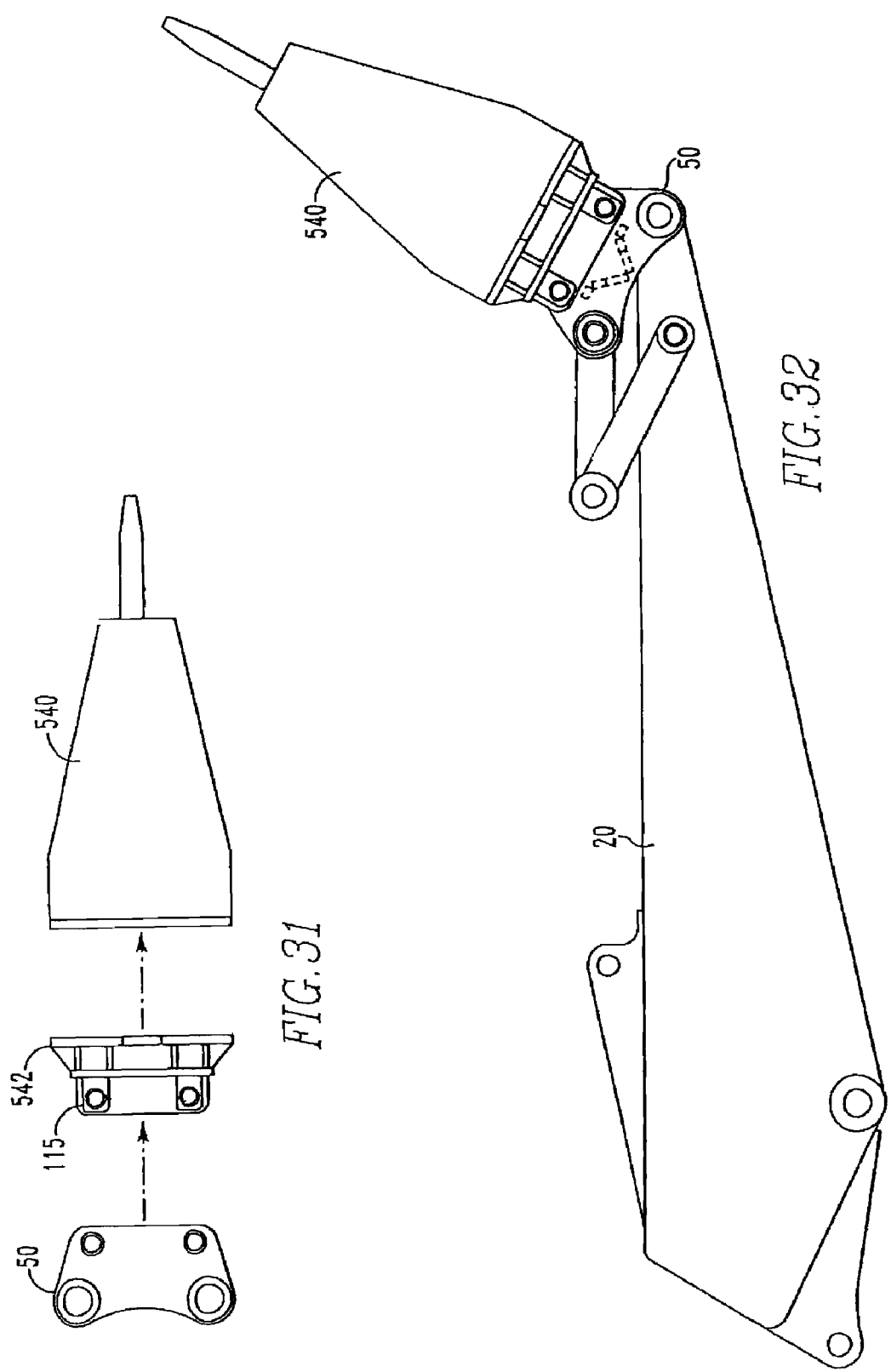

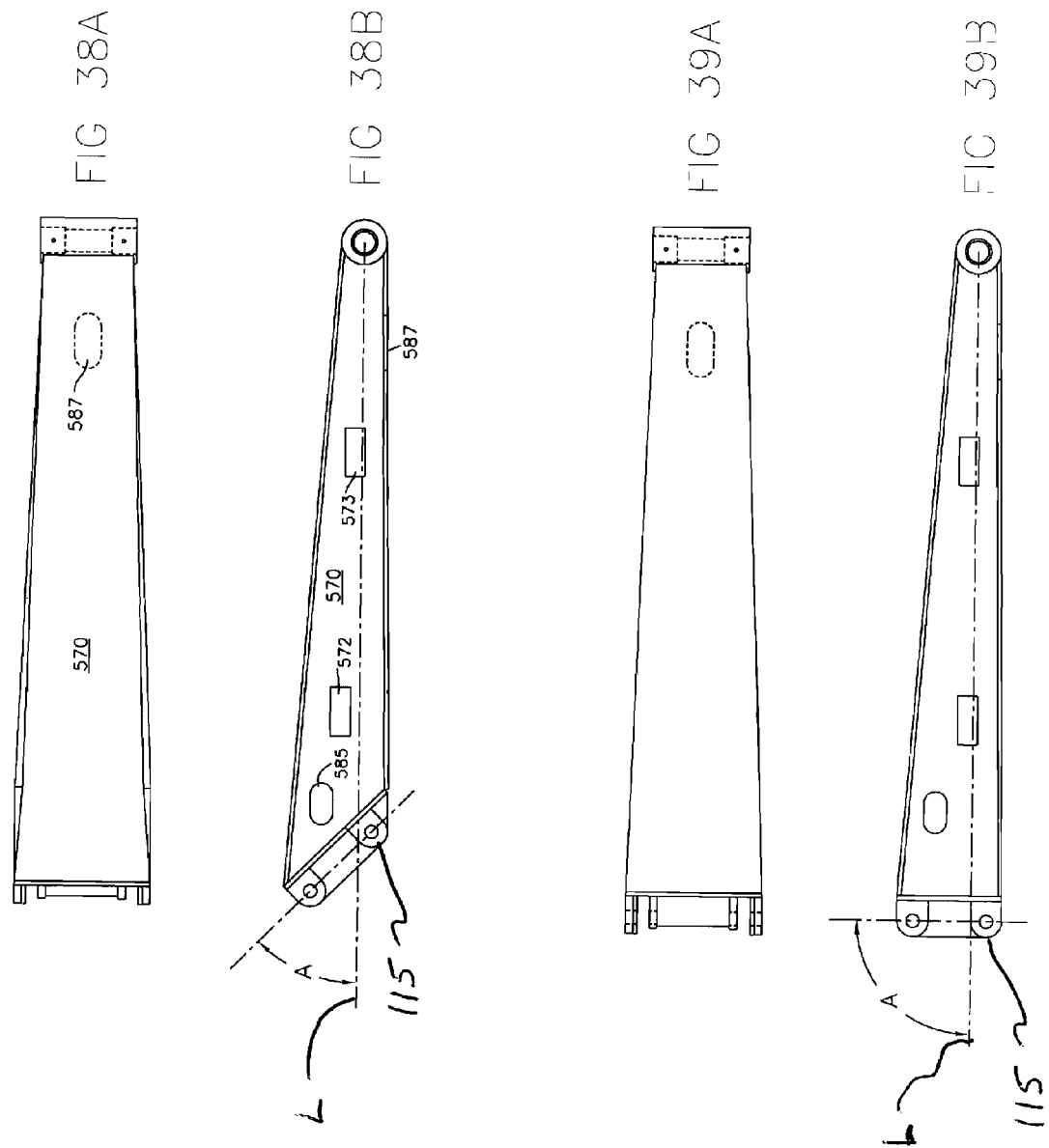

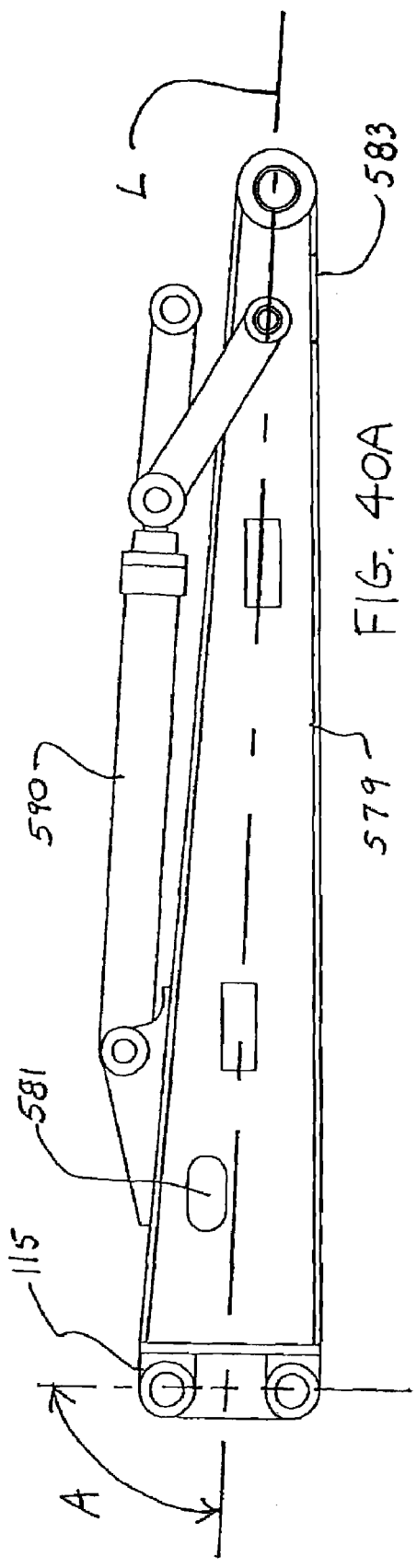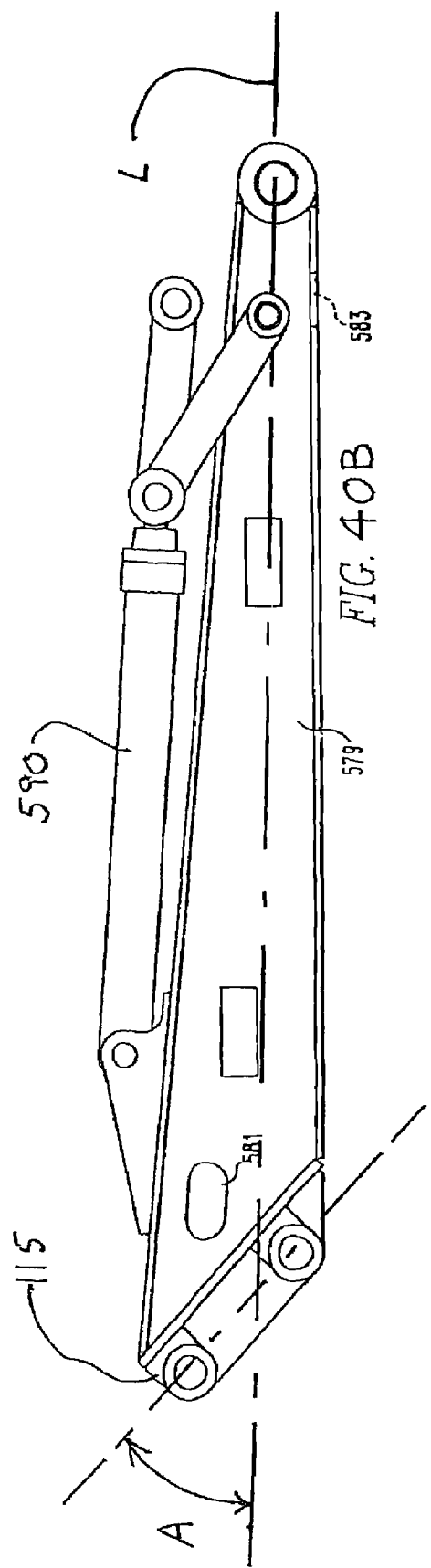

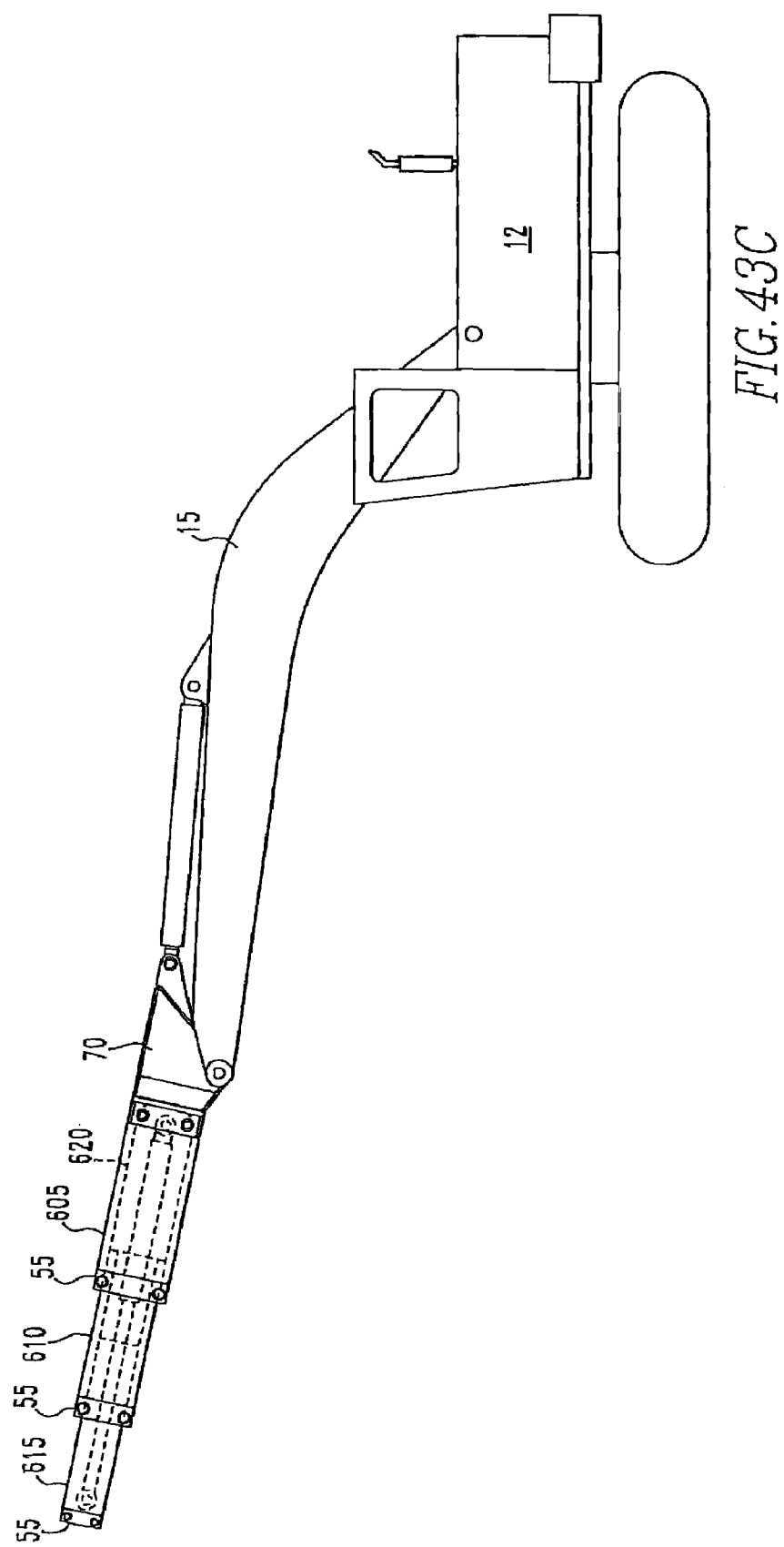

US 7,877,906 B2

MODULAR SYSTEM FOR CONNECTING ATTACHMENTS TO A CONSTRUCTION MACHINE

CROSS REFERENCE TO RELATED APPLICATIONS

This application is a continuation-in-part of U.S. application Ser. No. 11/331,818 filed Jan. 13, 2006.

BACKGROUND OF THE INVENTION

Field of the Invention

The present invention relates to a modular system for construction or demolition equipment which is adapted to be attached to a backhoe for attaching multiple tools, such as a heavy-duty metal cutting shear, a plate shear, a claw, a hammer, a bucket, a grapple or a concrete crusher.

While the discussion hereafter will make reference to construction equipment, such equipment is also referred to as demolition equipment, scrap handling equipment, and the like. The description of construction equipment is not intended to be restrictive of the equipment being referenced. Demolition equipment, such as heavy-duty metal cutting shears, plate shears, claws, hammers, buckets, grapples, and concrete crushers have been mounted on backhoes powered by hydraulic cylinders for a variety of jobs in the demolition field. This equipment provides for the efficient cutting and handling of scrap. For example, in the dismantling of an industrial building, metal scrap in the form of various diameter pipes, structural I-beams, channels, angles, sheet metal plates, and the like, must be efficiently severed and handled by heavy-duty metal shears. Such metal shears can also be utilized for reducing automobiles, truck frames, railroad cars, and the like. The shears must be able to move and cut the metal scrap pieces regardless of the size or shape of the individual scrap pieces and without any significant damage to the shears. In the demolition of an industrial building, concrete crushing devices, such as a concrete pulverizer or concrete crackers, are also used to reduce the structure to manageable components which can be easily handled and removed from the site. A grapple is often utilized where handling of debris or work pieces is a primary function of the equipment. Historically, all these pieces of equipment represent distinct tools having significant independent capital costs. Consequently, the demolition industry has tended to develop one type of tool that can have the greatest possible utility and application.

In general, construction equipment, such as a backhoe, is made up of a tractor having attached thereto a hydraulically operated boom and attached to the boom is a hydraulically operated stick. Each manufacturer of construction equipment provides a variety of attachments for their equipment, however, these attachments fit on only that manufacturer's equipment. As a result, the purchasing of such attachments not only requires a dedicated commitment to a single manufacturer of construction equipment, but furthermore, puts the equipment owner at a significant disadvantage if the particular equipment manufacturer does not provide a particular attachment which may be needed by the equipment owner. It is inefficient and costly for an equipment owner to own and maintain two separate construction machines because certain attachments are made by one manufacturer and certain other attachments are made by another manufacturer.

Additionally, different construction tasks require different configurations of the construction machine and, depending upon the equipment manufacturer, there may be only a limited number of configurations possible for a specific construction machine. In the event that the machine owner desires a different configuration, then it may be necessary to approach the equipment manufacturer and ask for the specialized services associated with a customized part. This may become prohibitively expensive.

A design is needed that will provide the machine owner with the flexibility of a single set of attachments that may be suitable for use with any of a variety of construction machines from different manufacturers. Furthermore, a design is needed whereby a machine owner may have the flexibility to configure the attachments in any desirable sequence, thereby maximizing the efficiency of the construction machine. Finally, a design is needed whereby it is possible for the machine owner to maximize the versatility of a construction machine by utilizing a plurality of different attachments that may be attached to the construction machine.

SUMMARY OF THE INVENTION

A modular system for connecting any one of a plurality of modules to an extension arm of a construction machine comprising:

a) a wing secured to the end of the extension arm, wherein the wing has a standardized proximal mounting arrangement; and b) a plurality of modules, wherein each module has a first end with a standardized distal coupling arrangement adapted to be coupled with the standardized proximal coupling arrangement so that each module may be interchangeably secured to the wing.

For use in a modular system for connecting any one of a plurality of modules together to an extension arm of a construction machine, the subject invention is also directed to an automatically actuated coupling system for securing the modules.

Another embodiment of the subject invention is directed to a module for connecting to the extension arm of a construction machine. The module has a body with a first end and a second end with a proximal coupling arrangement associated with the first end and a distal coupling arrangement associated with the second end. The distal coupling arrangement has a plate with a hole pattern and the proximal coupling arrangement has a mating plate with an aligned matching hole pattern. The mounting arrangements are complimentary, such that a second module having an identical one of the distal mounting arrangement or proximal mounting arrangement may be secured thereto.

Another embodiment of the subject invention is directed to a method for remotely locking a structural module onto the extension arm of a construction tool. The arm and module each have matching hole patterns adapted to receive common retention pins moved by a hydraulic cylinder. The method comprises the steps of:

a) aligning the hole patterns of the arm and module and b) activating the hydraulic cylinder to move the retention pins to engage the holes of each pattern, thereby securing the structural module to the extension arm.

Another embodiment of the subject invention is directed to a method of interchangeably securing structural modules to the extension arm of a construction machine, wherein each module has a standardized coupling arrangement comprising the steps of mounting a first module to the standardized coupling arrangement of the extension arm, removing the first module from the extension arm, and mounting a second module having an identical standardized coupling arrangement to the extension arm.

In yet another embodiment, the module is a modified stick having a longitudinal axis and a hydraulic cylinder mounted to the stick and the standard proximal coupling is pivotally attached to the hydraulic cylinder.

In yet another embodiment, a standardized proximal coupling arrangement is associated with a folding member and a standardized distal coupling arrangement is associated with an adapter, such that the folding member and the adapter may be releasably secured to one another.

These and other advantages of the present invention will be clarified in the description of the preferred embodiments, wherein like reference numerals represent like elements throughout.

BRIEF DESCRIPTIONS OF THE DRAWINGS

FIG. 1 is a schematic of a construction machine with the stick positioned to receive an attachment;

FIG. 2 is a schematic of the construction machine in FIG. 1 with a stick wing mounted to the stick;

FIGS. 15, 16, 17 and 18 are exploded side views of different configurations of modules possible utilizing the design in accordance with the subject invention;

FIGS. 21A-21D are sequential side views of the motion possible utilizing the arrangement in accordance with FIG. 18;

FIGS. 24-26 are a side view, a left end view, and a right end view of a rotator module in accordance with the subject invention;

FIG. 31 is an exploded side view of a hammer associated with a stick wing;

FIG. 32 is the hammer illustrated in FIG. 31, but assembled and mounted upon the stick of a construction machine;

FIGS. 38A and 38B are a top view and a side view, respectively, of the supplemental extension arm illustrated in FIG. 37A.

FIGS. 39A and 39B are a top view and a side view, respectively, of the supplemental extension arm illustrated in FIGS. 38A and 38B, but having a squared-off coupling end;

FIG. 40A is a modified stick having a squared-off coupling end;

FIG. 40B is a modified stick similar to the modified stick illustrated in FIG. 40A, but with an angled coupling end;

FIGS. 43A-43C illustrate, in different positions, a telescopic adapter module mounted to the boom of a construction machine

DESCRIPTION OF THE PREFERRED EMBODIMENTS

Figure 3:
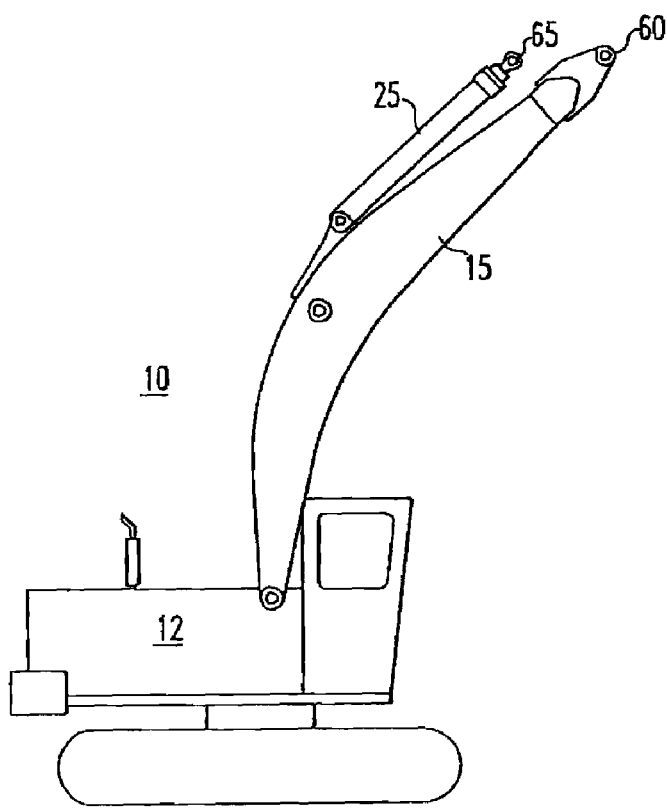
FIG. 3 is a schematic of a construction machine with the boom positioned to receive an attachment.

FIG. 1 illustrates a construction machine 10, including a tractor 12, having an extension arm or boom 15 mounted thereupon and pivoted upon the tractor 12 with a hydraulic cylinder (not shown). Attached to the boom 15 is an extension arm or stick 20 operated by a hydraulic cylinder 25 attached between the boom 15 and the stick 20. A stick pivot attachment point 30, in conjunction with a stick linkage attachment point 35, provides points of attachment through which other tools and accessories may be attached to the stick 20. A hydraulic cylinder 40, in conjunction with a connecting linkage 45, acts to move the stick linkage attachment point 35 to manipulate any accessory attached thereto. It is important to note that the stick pivot attachment point 30 and stick linkage attachment point 35 may significantly differ from one manufacturer to another such that one accessory or tool from a particular manufacturer may not be compatible to mount upon the stick of another manufacturer.

Directing attention to FIG. 2, the subject invention is intended to overcome this deficit by providing a modular system comprised of different functional modules that may be attached to the stick 20 through the use of a stick wing 50. The proximal end 51 of the stick wing 50 is connected to the stick 20 at the stick pivot attachment point 30 and at the stick linkage attachment point 35. The distal end 52 of the stick wing 50 includes a standardized proximal coupling arrangement 55 which may be used as a base for mounting any number of modular accessories or tools.

Figure 4:
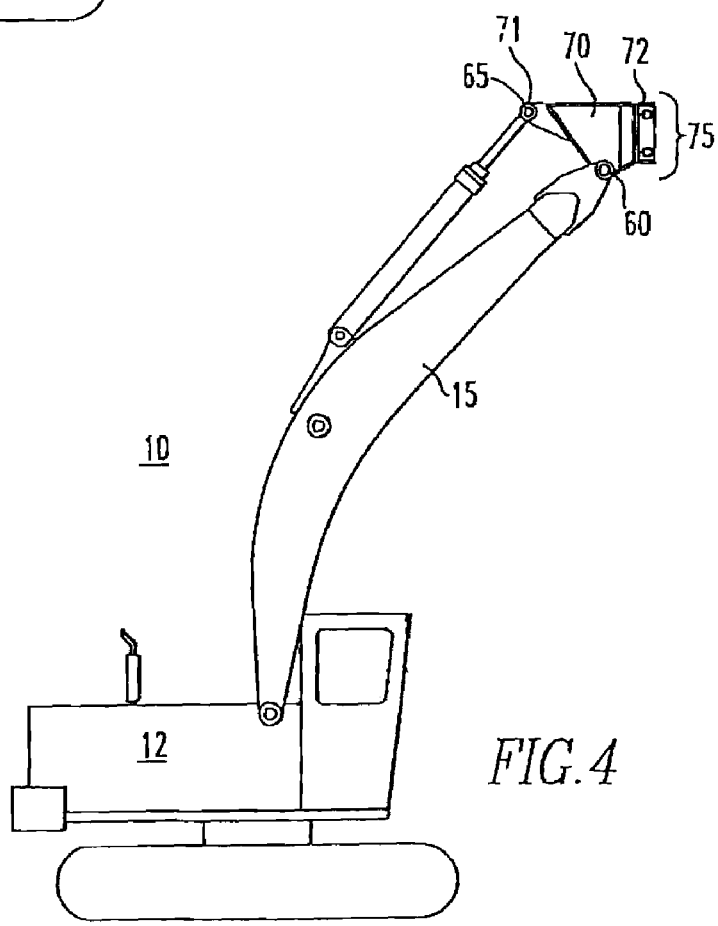
FIG. 4 is a schematic of the construction machine in FIG. 3 with a boom wing attached to the boom.

Additionally, directing attention to FIGS. 3 and 4, which illustrate a construction machine 10 having a tractor 12 with only a boom 15 extending therefrom, a boom pivot attachment point 60 and a boom linkage attachment point 65, driven by the hydraulic cylinder 25, may be used as attachment points to receive the proximal end 71 of a boom wing 70 (FIG. 4). Once again, a distal end 72 of the boom wing 70 has a standardized proximal coupling arrangement 75 adapted to receive a variety of different modular accessories and tools.

Through the use of the stick wing 50 and the boom wing 70 it is possible to adapt a large variety of different construction machines to accept a plurality of standardized attachments and tools, thereby providing the maximum versatility for a construction machine 10 in the event a manufacturer does not provide a full complement of such attachments and/or tools, or, in the event a machine owner wishes to maximize the capacity of the machine.

In particular, the proximal end 51 of the stick wing 50 or the proximal end 71 of the boom wing 70 may be customized to accommodate the stick attachment points or the boom attachment points of any variety of different designs.

Figure 5A:
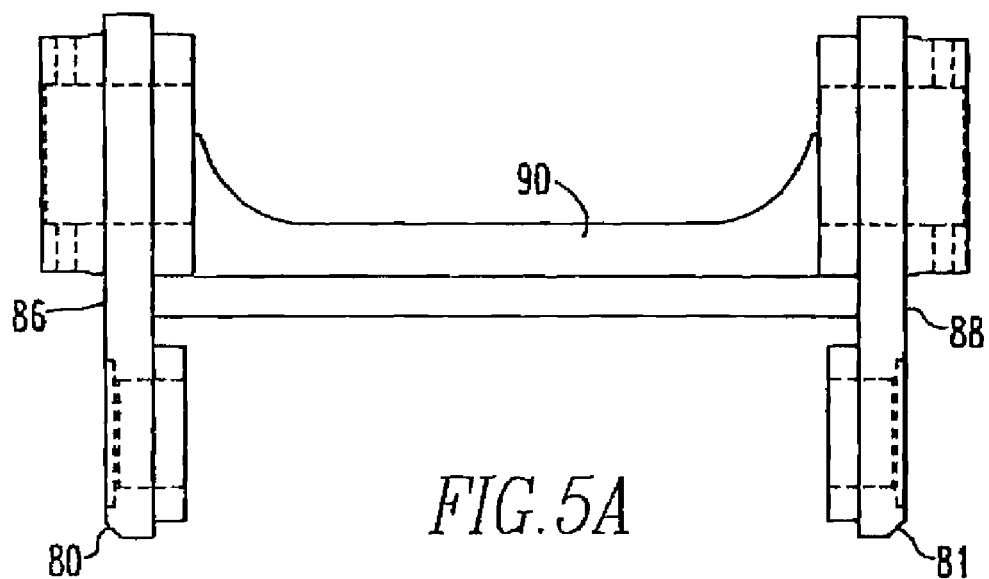
FIGS. 5A and 5B are a side view and a front view of a stick wing.
Figure 5B:
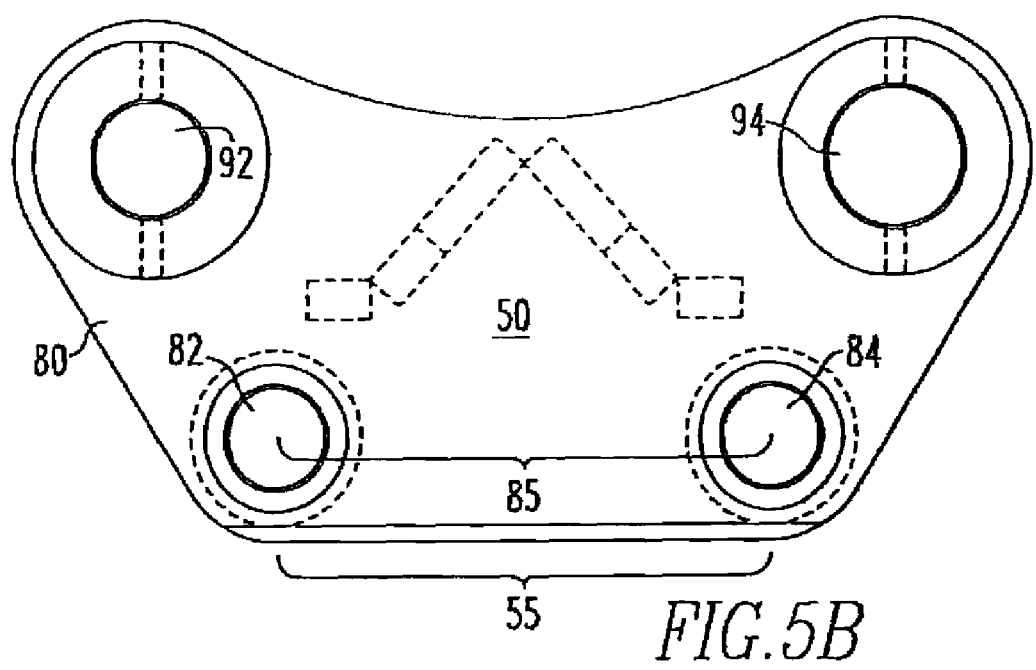

FIGS. 5A and 5B illustrate a front and side view of a stick wing 50. In particular, the stick wing 50 is comprised of at least two plates 80, 81, each having at least two holes 82, 84 extending therethrough and spaced apart to define a hole pattern 85. The at least two opposing plates 80, 81 have mounting surfaces 86, 88 thereupon. It is the location of these plates 80, 81 and the associated holes 82, 84 which define the proximal coupling arrangement associated with the stick wing 50. The opposing plates 80, 81 are connected together through the use of a connecting member 90.

Additionally, each opposing plate 80, 81 has therethrough connecting bores 92, 94 spaced apart from one another on each plate 80, 81. It is the location and design of each of these connecting bores 92, 94 which provide a connection to the stick wing 50 of one manufacturer or another manufacturer. The stick wing 50 may be designed such that the size and the location of the connecting bores 92, 94 accommodate the attachment of the stick for different construction machines. While it may be necessary for a machine owner to have in inventory a variety of different stick wings 50, each designed to adapt for different construction machinery, it will not be necessary for the machine owner to purchase customized tools for each construction machine because, as will be seen, the modular system, in accordance with the subject invention, permits the use of a single set of tools upon machines from different manufacturers.

Figure 6B:
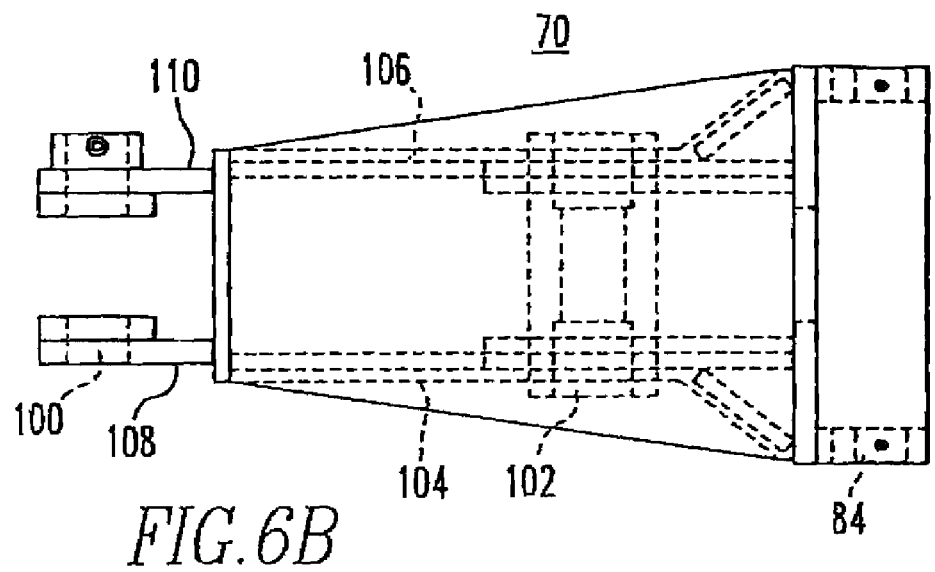
FIGS. 6A and 6B are a side view and a top view of a boom wing.
Figure 6A:
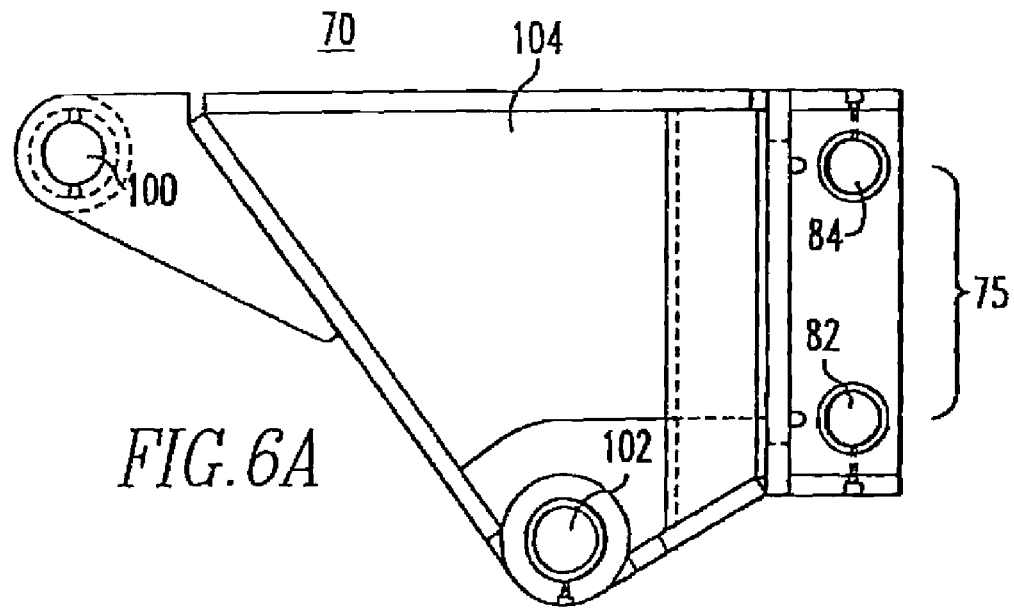

FIGS. 6A and 6B illustrate a side view and a top view of a boom wing 70 having the standardized proximate coupling arrangement 75 and connecting bores 100, 102 extending through plates 104, 106 designed to be connected to the boom pivot attachment point 60 and boom linkage attachment point 65 illustrated in FIG. 3. The standardized proximal coupling arrangement 75 is identical to the standardized proximal coupling arrangement 55 previously described in association with the stick wing 50. Additionally, the connecting bores 100, 102 may be sized and spaced appropriately to accommodate the attachment points for booms from manufacturers of different construction machines. Just as with the stick wing 50, the boom wing 70 may be comprised of at least two opposing plates 104, 106 and each of these opposing plates 104, 106 may have mounting surfaces 108, 110.

Figure 7A:
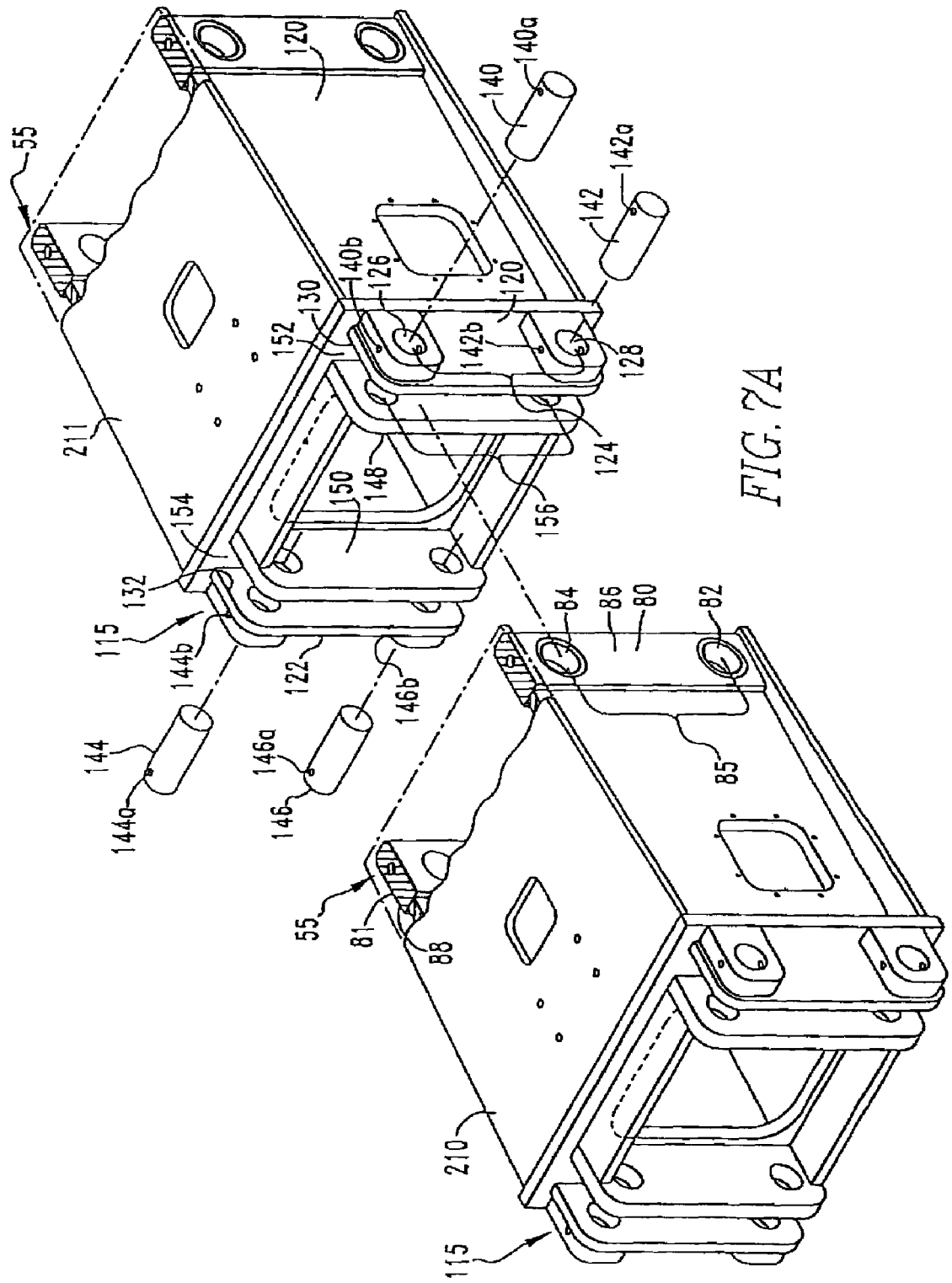
FIG. 7A is an exploded isometric view of one embodiment of the coupling arrangement in accordance with the subject invention.
Figure 7B:
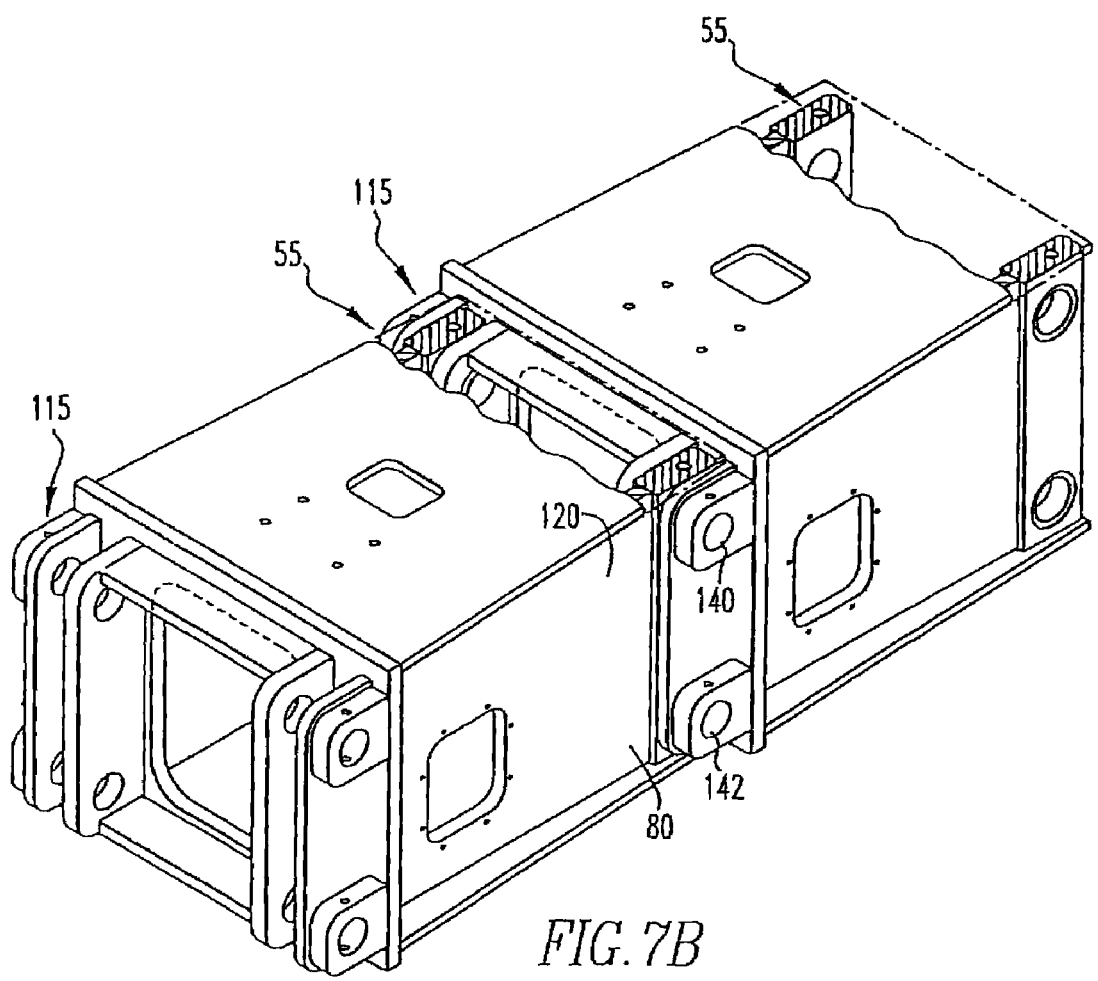
FIG. 7B is an assembled isometric view of the coupling arrangement illustrated in FIG. 7A.

A typical configuration for the proximal coupling arrangement and distal coupling arrangement herein discussed is illustrated in FIGS. 7A and 7B. Directing attention to FIG. 7A, an adapter 210 having a standardized proximal coupling arrangement 55 is illustrated in an exploded isometric view relative to the standardized distal coupling arrangement 115 of another adapter 211. In particular, and using reference numbers already used with respect to the stick wing 50 and the boom wing 70, the proximal coupling arrangement 55 is comprised of opposing plates 80, 81 with a hole pattern 85 defined by holes 82, 84 which extend through both plates 80, 81. Each plate 80, 81 has a mounting surface 86, 88.

The standardized distal coupling arrangement 115 is also comprised of at least two opposing plates 120, 122 with a hole pattern 124 defined by spaced-apart holes 126, 128. Each opposing plate 120, 122 has a mounting surface 130, 132 each of which is generally aligned with a mounting surface 86, 88 of the distal coupling arrangement 55. The opposing plates 80, 81 of the proximal coupling arrangement 55 are spaced in complimentary relationship with the opposing plates 120, 122 of the distal coupling arrangement 115, such that when the plates 80, 81 and 120, 122 are merged, the mounting surfaces 86, 130 and 88, 132 are adjacent to one another. Additionally, the hole pattern 85 of the distal coupling arrangement 55 identified by holes 82, 84 match the hole pattern 124 of the distal coupling arrangement 115 defined by holes 126, 128. As a result, the proximal coupling arrangement 55 is mated with the distal coupling arrangement 115 and the hole patterns 85, 124 align, such that the retention pins 140, 142, 144, 146 may be inserted within the holes, thereby securing the proximal coupling arrangement 55 within the distal coupling arrangement 115, as illustrated in FIG. 7B. The retention pins 140, 142, 144, 146 each have bores 140a, 142a, 144a, 146a extending diametrically therethrough to accept locking pins (not shown) which are engaged through the bores 140*a*, 142*a*, 144*a*, 146*a* and through matching bores 140*b*, 142*b*, 144*b*, 146*b* extending through the adapter.

It is also possible, as illustrated in FIG. 7A, for the distal coupling arrangement 115 to further include with each opposing plate 120, 122 a reinforcement plate 148, 150 spaced next to the opposing plate 120, 122 to define slots 152, 154 therebetween. Each reinforcement plate 148, 150 has an identical hole pattern 156 to that of the hole pattern 124 associated with the opposing plate within the slot 152.

From inspection of FIG. 7A, it should be appreciated that each adapter module 210, 211 has a standardized proximal coupling arrangement 55 and a standardized distal coupling arrangement 115 at each end. As a result, a plurality of adapter modules 210, 211 may be connected to one another in a string of modules. As will be discussed, each different type of module hereinafter discussed will have one or both of the proximal coupling arrangement 55 and the distal coupling arrangement 115. As a result, these modules may be selected and matched with one another to provide a nearly limitless combination of different modules.

Although throughout this application a specific configuration is described with respect to each distal coupling arrangement and each proximal coupling arrangement, it is entirely possible for the configuration associated with one coupling arrangement to be associated with the other configuration. In particular, with respect to FIG. 7A, it is entirely possible for the distal coupling arrangement to be associated with reference number 115 and the proximal coupling arrangement to be associated with reference number 55.

Figure 8:
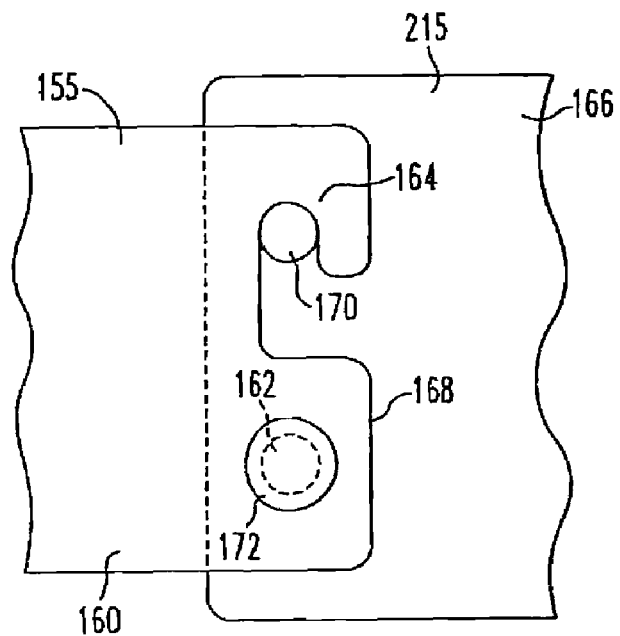
FIG. 8 is a side view of an alternate embodiment of the coupling arrangement in accordance with the subject invention.

Although the proximal coupling arrangement and mating distal coupling arrangement heretofore disclosed will be the typical arrangement discussed throughout this application, it should be appreciated that there are multiple other coupling arrangements which may be used with the subject invention. In particular, as illustrated in FIG. 8, a standardized distal coupling arrangement 155 is mateable with a standardized proximal coupling arrangement 215, whereby the arrangement 155 is comprised of a hooking plate 160 with a hole 162 therethrough and a spaced-apart hook 164. The proximal coupling arrangement 215 is comprised of a hooked plate 166 with a spaced-apart hole 168 therethrough and a pivot pin 170, such that the hook 164 of the hooking plate 160 may engage the pivot pin 170 of the hooked plate 166 and the spaced-apart holes 162, 168 aligned to receive a support pin 172 extending therethrough, thereby providing a secure coupling between the distal coupling arrangement 155 and the proximal coupling arrangement 215.

Figure 9:
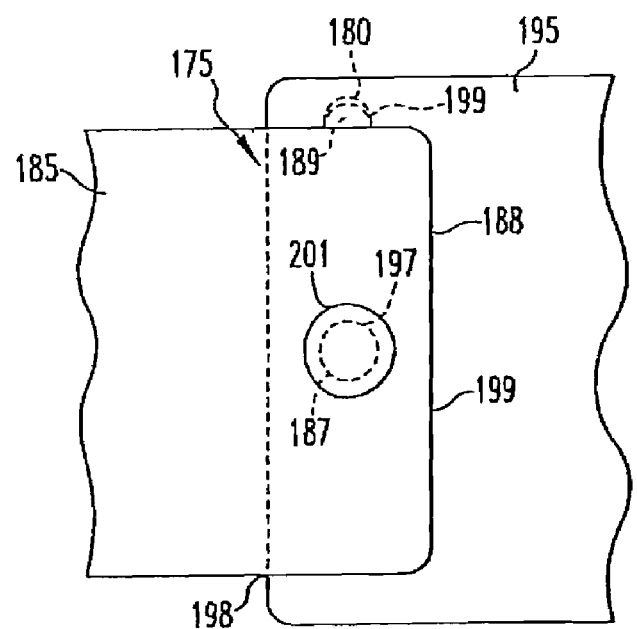
FIG. 9 is a side view of another alternate coupling arrangement in accordance with the subject invention.

FIG. 9 illustrates yet another coupling arrangement, whereby a distal coupling arrangement 175 is connected to a proximal coupling arrangement 180. In particular, the distal coupling arrangement 175 is comprised of a plate 185 having a hole 187 extending therethrough and a wide protruding end 188. A projection 189 extends transversely to the end 188. The proximal coupling arrangement 180 is comprised of a plate 195 having a hole 197 extending therethrough and a matching wide receiving end 198. A recess 199 complimentary in shape to the projection 189 extends transversely within the end 198 in a direction corresponding to the projection 189. The wide protruding end 188 of the distal coupling arrangement 175 is brought into abutment with the matching wide receiving end 199 of the proximal coupling arrangement 215, wherein the holes 187, 197 are aligned and the projection 189 is engaged with the recess 199. A retention bolt 201 is then placed within the holes 187, 197 to provide a secure coupling between the two coupling arrangements 175, 180.

What has so far been described is a distal mounting arrangement secured to a proximal mounting arrangement through the use of pins which are secured within mating hole patterns between the proximal mounting arrangement and the distal mounting arrangement. While it is entirely possible to manually secure these pins within the holes of the matching hole patterns, it is also possible to automate this function so that the pins may be hydraulically activated to be engaged or disengaged from the matching holes of the proximal mounting arrangement and distal mounting arrangement.

Figure 10:
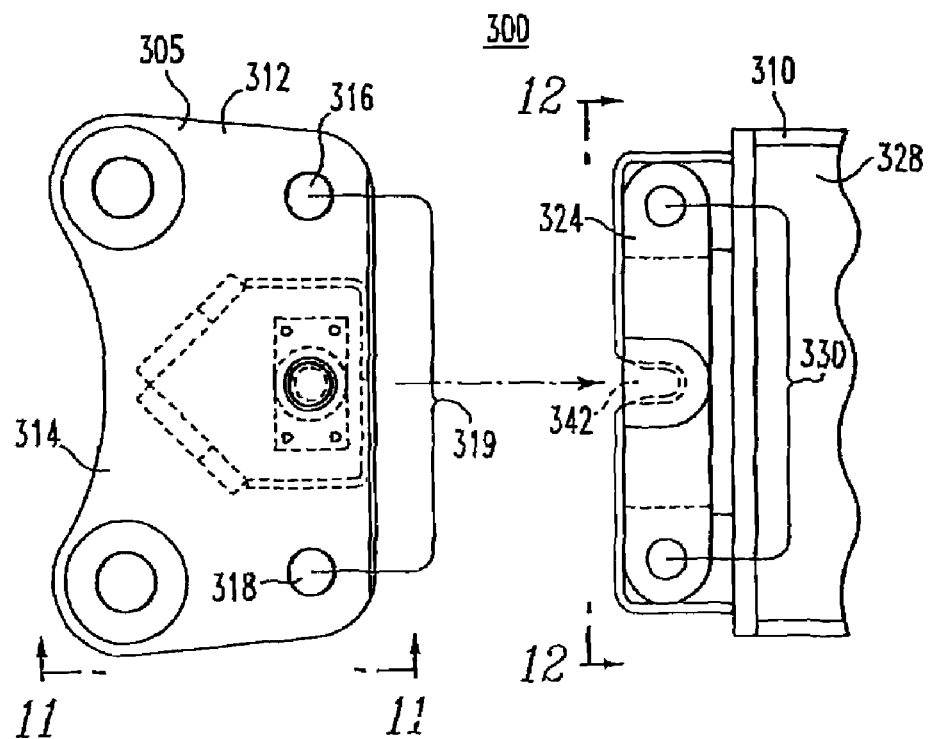
FIG. 10 is an exploded view of a stick wing and a portion of an adapter.

In particular and directing attention to FIGS. 10-13C, an automatically actuated coupling system 300 will be discussed. For purposes of discussion, as shown in FIG. 10, a stick wing 305 will be attached to an adapter 310. The stick wing 305 is comprised of a base 312 having at least one plate 314 with at least two holes 316, 318 extending therethrough defining a hole pattern 319.

Figure 11:
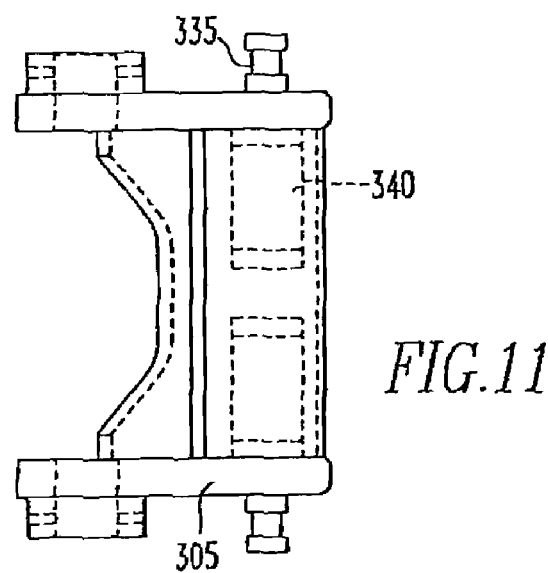
FIG. 11 is the view of the stick in FIG. 10 along lines "XI-XI" in FIG. 10.
Figure 12A:
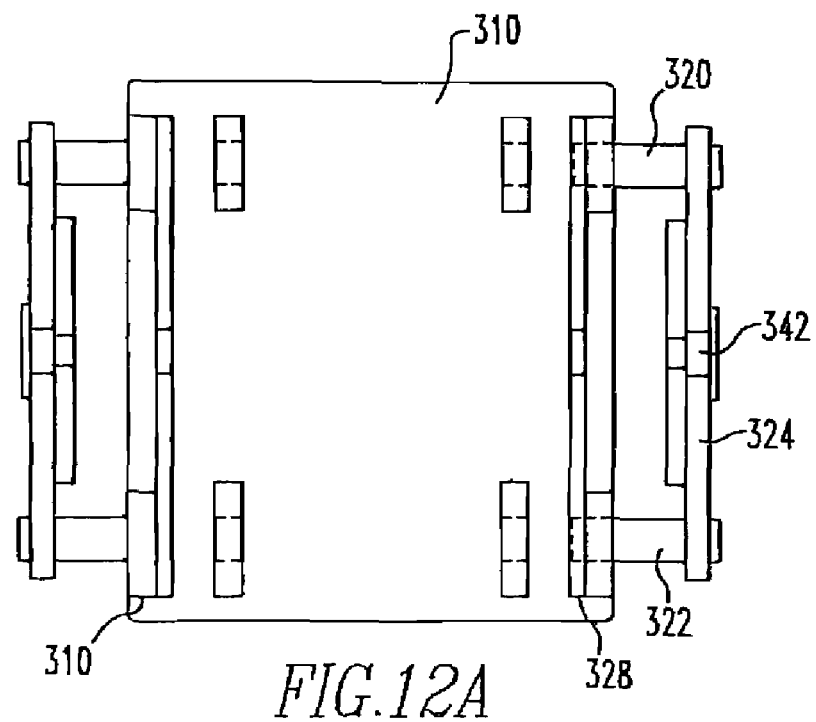
FIG. 12A is a view of the adapter illustrated in FIG. 10 along lines "XII-XII" with the tie bars extended.
Figure 12B:
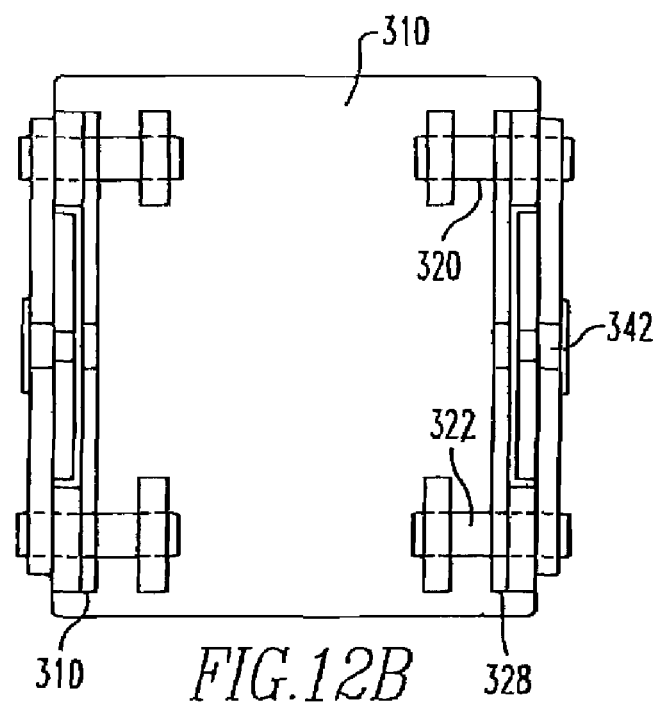
FIG. 12B is a view of the adapter in FIG. 12A with the tie bars retracted.
Figure 13A:
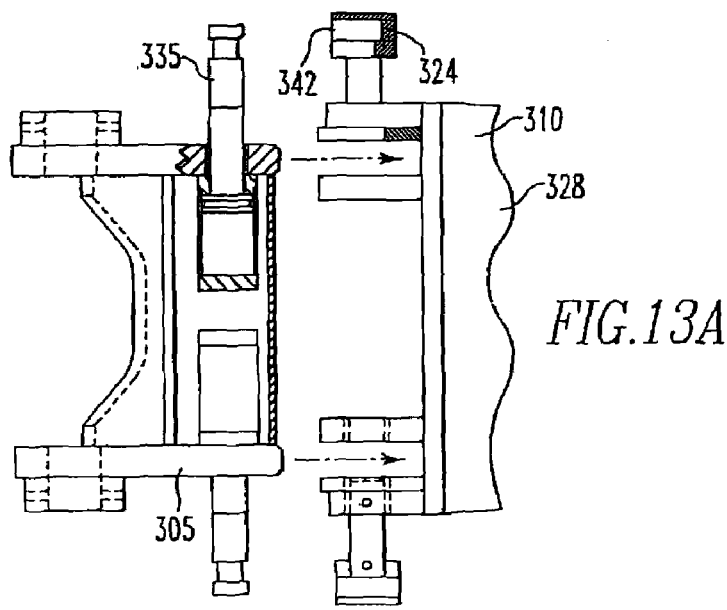
FIGS. 13A-13C illustrate the sequential steps for securing the stick wing to the adapter.
Figure 13B:
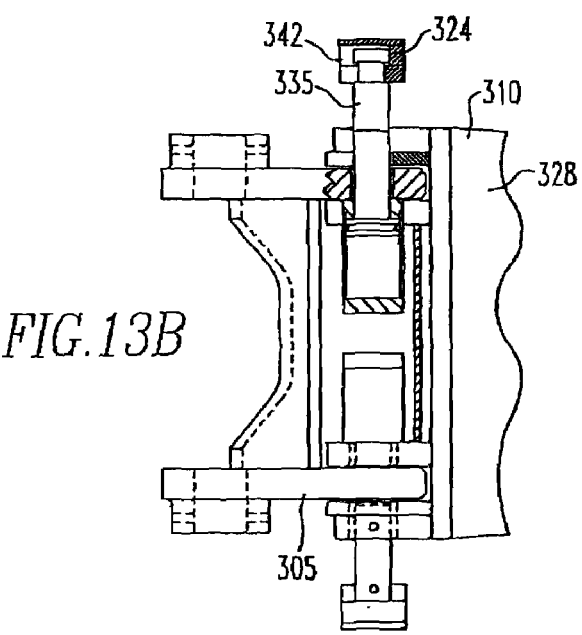
Figure 13C:
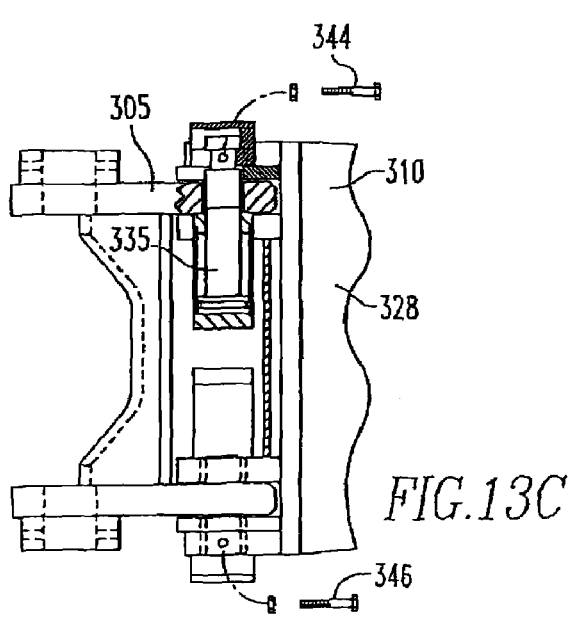

Directing attention to FIGS. 10 and 12A, and focusing on one half of a coupling arrangement 305, 310, at least two locking posts 320, 322 are aligned with the holes 316, 318 and secured to a tie bar 324. When the stick wing 305 is aligned with the adapter 310, the posts 320, 322 are slidable within the holes 316, 318 of the base plate 314. The adapter 310 is a module having a plate 328 with a hole pattern 330 extending therefrom matching that hole pattern 319 of the base plate 314 when the adapter 310 is positioned next to the stick wing 305. A manipulator rod 335 (FIG. 11) is moved back and forth by an actuator 340. FIG. 11 illustrates the manipulator rod 335 in a retracted position. The actuator 340 may be, among other things, a hydraulic cylinder or an electric solenoid capable of moving the manipulator rod 335 from a retracted position, illustrated in FIG. 11, to an extended position, illustrated in FIG. 13A. The manipulator rod 335 extends from the stick wing 305 to engage a slot 342 in the tie bar 324, as illustrated in FIGS. 10 and 13A. As illustrated in FIG. 13B, once the manipulator rod 335 engages the slot 342 within the tie bar 324 the manipulator rod 335 may be retracted, which at the same time will pull the tie bar 324 toward the adapter plate 328 thereby moving the locking posts 320, 322 (FIG. 12A) into the holes 316, 318 (FIG. 10) of the wing 305 to secure the adapter 310 within the wing 305. FIGS. 12A and 13A illustrate the adapter 310 with the tie-bar 324 and the pins 320, 322 in the extended position, while FIG. 13C illustrates the stick wing 305 secured to the adapter 310 when the tie bar 324 is positioned in the retracted manner. As a safety precaution, directing attention to FIG. 13C, locking pins 344, 346 may be used to secure the manipulator rod 335 within its retracted position relative to the adapter 310. By utilizing such an arrangement, it is possible to automatically actuate retention pins to engage or disengage modules associated with one another.

It should be noted that in a preferred embodiment, the stick wing 305 and the adapter 310 have been discussed with a single based plate 314 and a single adapter plate 328. However, it should be understood and as illustrated in FIGS. 10-13C, that each stick wing 305 and adapter 310 has at least a pair of opposing plates to provide an arrangement which is symmetrical about the center of each the stick wing 305 and the adapter 310. It should also be noted that while, with respect to FIGS. 10-13C, only one side of the arrangement was discussed, there are four retention pins in a typical adapter coupling in a symmetric arrangement to pins 320, 322, illustrated in FIG. 12A.

FIGS. 10-13C illustrate what type of automatically actuated coupling system 300, whereby the locking posts mounted upon the adapter 310 are moved inwardly to engage the holes 316, 318 of the stick wing 305.

Figure 44:
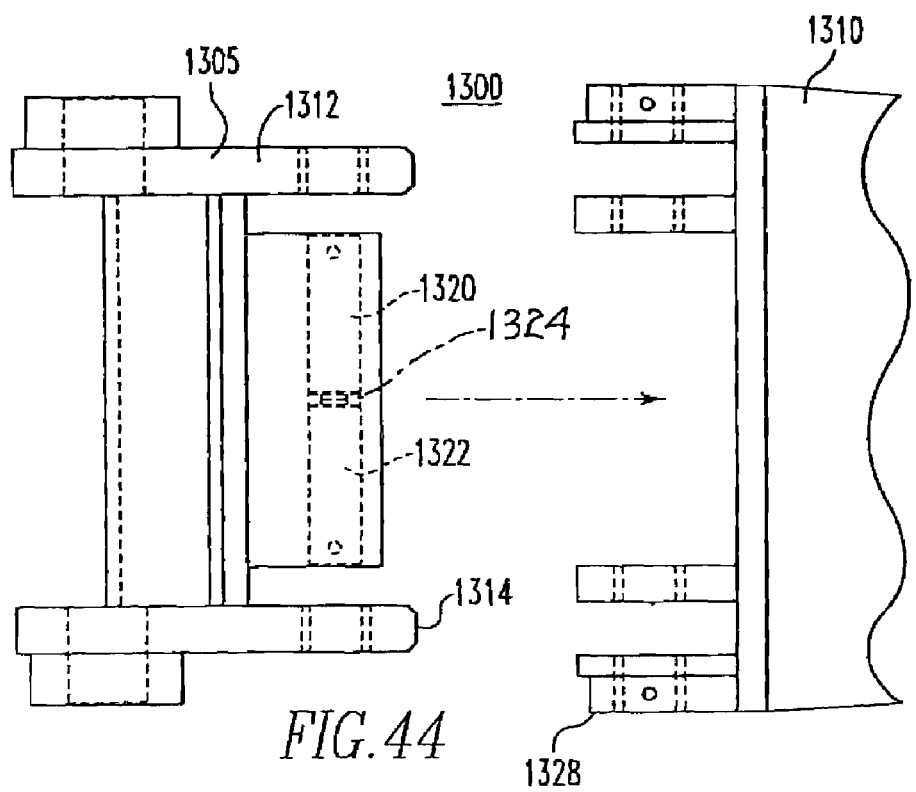
FIG. 44 is an exploded top view of a stick wing and a portion of an adapter.
Figure 45:
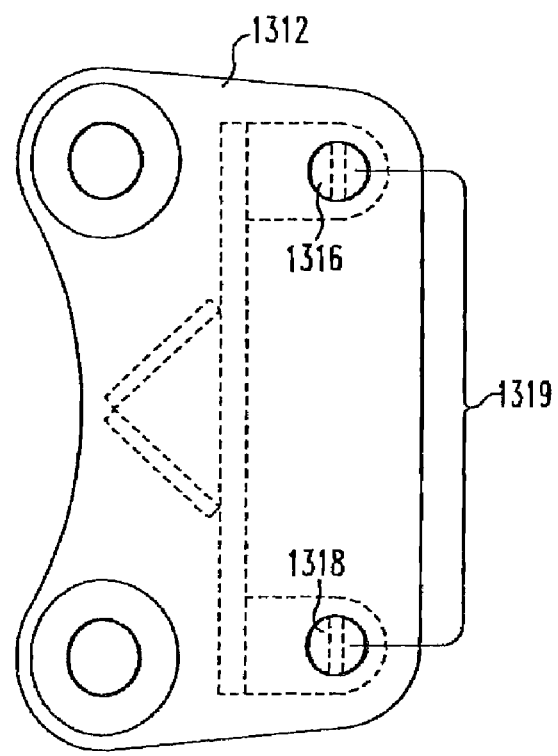
FIG. 45 is a side view of the stick wing illustrated in FIG. 44.
Figure 46:
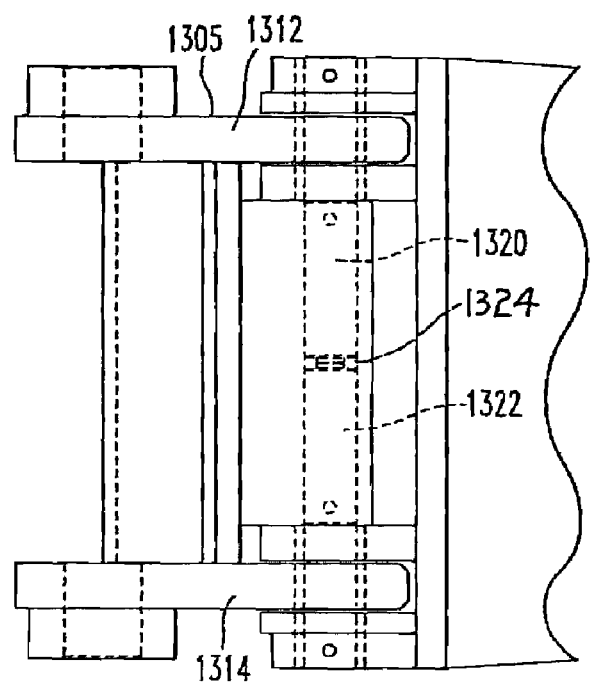
FIG. 46 is an assembled top view of the arrangement illustrated in FIG. 44, with the locking pins retracted.
Figure 47:
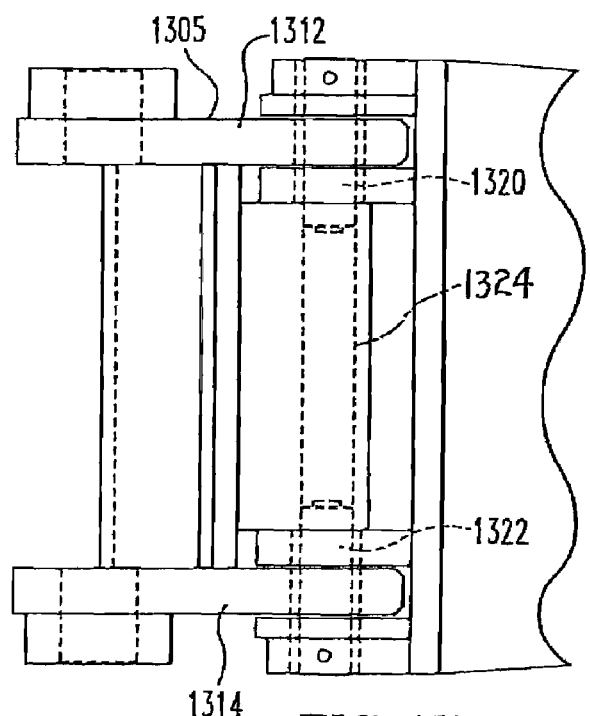
FIG. 47 is an assembled top view similar to the arrangement illustrated in FIG. 46, but with the locking pins extended to engage the adapter.

Directing attention to FIGS. 44-47, it is also possible for the locking posts to move outwardly. In particular, as automatically actuated coupling system 1300 will be discussed. For purposes of discussion as shown in FIG. 44, a stick wing 1305 will be attached to an adapter 1310. The stick wing 1305 is comprised of a base 1312 having at least one plate 1314 with at least two holes 1316, 1318 extending therethrough defining a hole pattern 1319. At least two locking posts 1320, 1322 are aligned with the holes 1316, 1318 and slidably mounted within a guide 1324 attached to the stick wing base. When the stick wing 1305 is aligned with the adapter 1310, the posts 1320, 1322 are slidable within the holes 1316, 1318 of the base plate 1314. The adapter 1310 is a module having a plate 1328 with a hole pattern similar to that of hole pattern 1319 extending therefrom and matching the hole pattern 1319 of the base plate 1314 when the adapter 1310 is positioned next to the stick wing 1305. When the stick wing 1305 is properly positioned adjacent to the adapter 1310, the locking pins 1320, 1322 are expanded outwardly to engage the holes 1316, 1318 from the retracted position, illustrated in FIG. 46, to the extended position, illustrated in FIG. 47, where the locking posts 1320, 1322 engage the adapter 1310. The locking posts 1320, 1322 may be hydraulically activated within the guide 1324. It should be noted that while the locking posts 1320, 1322 within the guide 1324 are associated with the stick wing 1305, it is entirely possible for the locking posts 1320, 1322 within the guide 1324 to be associated instead with the adapter 1310.

Figure 14B:
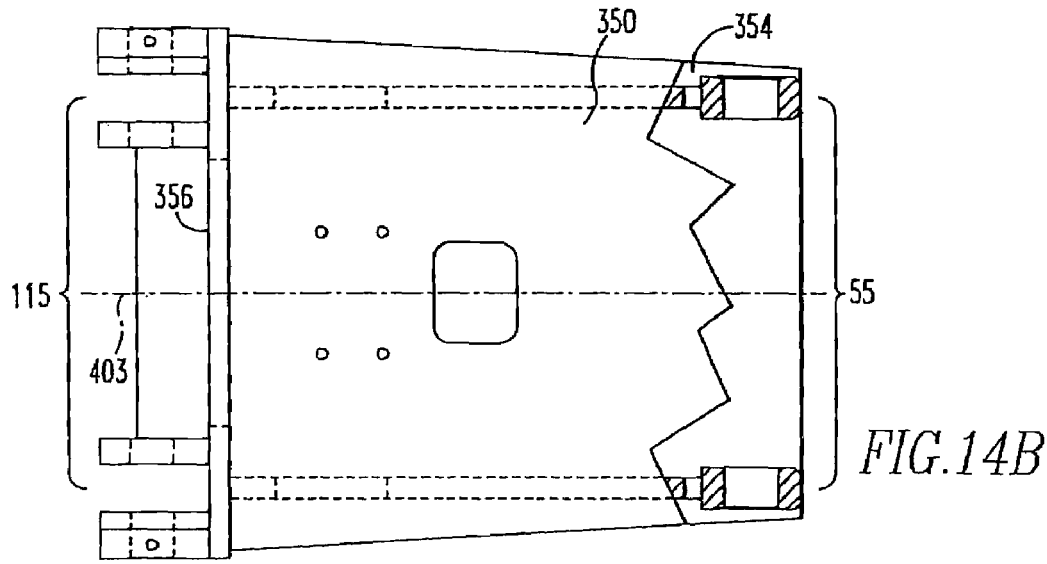
FIGS. 14A, 14B and 14C are front, top and left end views, respectively, of an adapter.
Figure 14A:
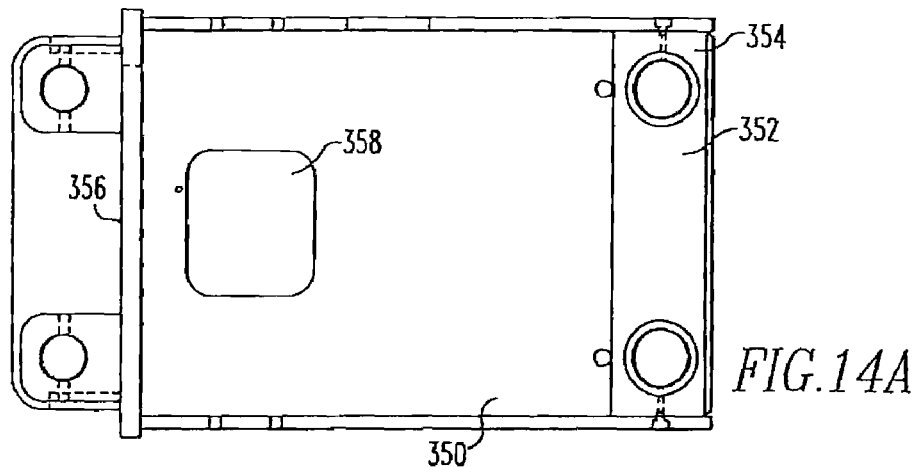
Figure 14C:
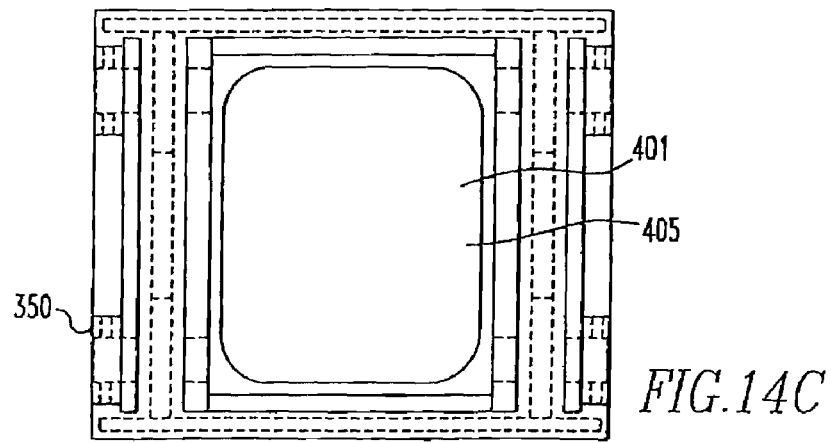

Briefly returning to FIGS. 7A and 7B, described therein was a proximal coupling arrangement 55 mateable with a distal coupling arrangement 115. FIGS. 14A-14C illustrate a single adapter module 350 for connecting to a construction machine, wherein the module 350 has a body 352 with a first end 354 and a second end 356. A proximal coupling arrangement 55 similar to that illustrated in FIG. 7A is associated with the first end 354 and a distal coupling arrangement 115 similar to that illustrated in FIG. 7A is associated with the second end 356. The reference numbers applied in FIG. 7A may also be applied to the elements in FIGS. 14A-14C. It should be appreciated that other modules having a proximal coupling arrangement 55 on their first end and a distal coupling arrangement 115 on their second end may be arranged with one another and interlocked together in any desirable fashion. It is this interchangeability which provides the machine owner with maximum versatility and maximum efficiency in mixing and matching any number of a variety of different modules each having a proximal coupling arrangement and a distal coupling arrangement or both with each compatible with other modules.

The module 350, illustrated in FIGS. 14A-14C, is an adapter module which, as will be discussed, is intended to attach to a multi-tool. The adapter module 350 at its first end 354 includes a sleeve 401 with a longitudinal axis 403 and a passageway 405 extending therethrough along the longitudinal axis 403. The sleeve 401 is adapted to encompass the hydraulic cylinder portion 362 (FIG. 15) on the end of the multi-tool 360, which is used to operate the multi-tool 360.

FIG. 15 is an exploded side view of an arrangement, whereby a stick wing 50 may be secured to an adapter module 350 which itself may be secured to a multi-tool 360. The multi-tool 360 includes a distal coupling arrangement 115 similar to that illustrated in the adapter module 350 of FIGS. 14A-14C.

Briefly returning to FIGS. 14A-14C, the body 352 includes a window 358. When the adapter module 350 is secured to the multi-tool 360, the window 358 provides access for the hydraulic lines which operate the multi-tool 360.

FIG. 16 illustrates the stick wing 50 with the adapter module 350 and a multi-tool 360 adjacent thereto. Between the stick wing 50 and the adapter module 350 is an extension module 365 which is similar to the adapter module 350 but exists purely to provide an extension between the stick wing 50 and another module. The extension module 365 includes a support structure 367 with a proximal coupling arrangement 55 associated with the first end 369 and a distal coupling arrangement 115 associated with the second end 371.

While the adapter module 350 and the extension module 365 provide rigid structures between the proximal coupling arrangement and the distal coupling arrangement of each of these modules, FIG. 17 illustrates a folding module 375 which is capable of pivoting such that the proximal coupling arrangement 55 and distal coupling arrangement 115 may be oriented relative to one another at different angles. The folding module 375, illustrated in FIG. 17, is attached to an adapter module 350 at the first end 377 and to a stick wing 50 at the second end 379. Just as before, the adapter module 350 is connected to the multi-tool 360.

The configuration illustrated in FIG. 18 is identical to the configuration illustrated in FIG. 17 with the exception that the stick wing 50 is replaced by the boom wing 70 previously described. With this interchangeability, it should be appreciated that any modules that may be attached to the stick wing 50, illustrated in FIG. 2, may also be attached to the boom wing 70, illustrated in FIG. 4. Nevertheless, returning to FIG. 18, the folding module 375 as described with respect to FIG. 17 is capable of orienting the proximal coupling arrangement 55 at a different angle relative to the distal coupling arrangement 115.

Figure 19:
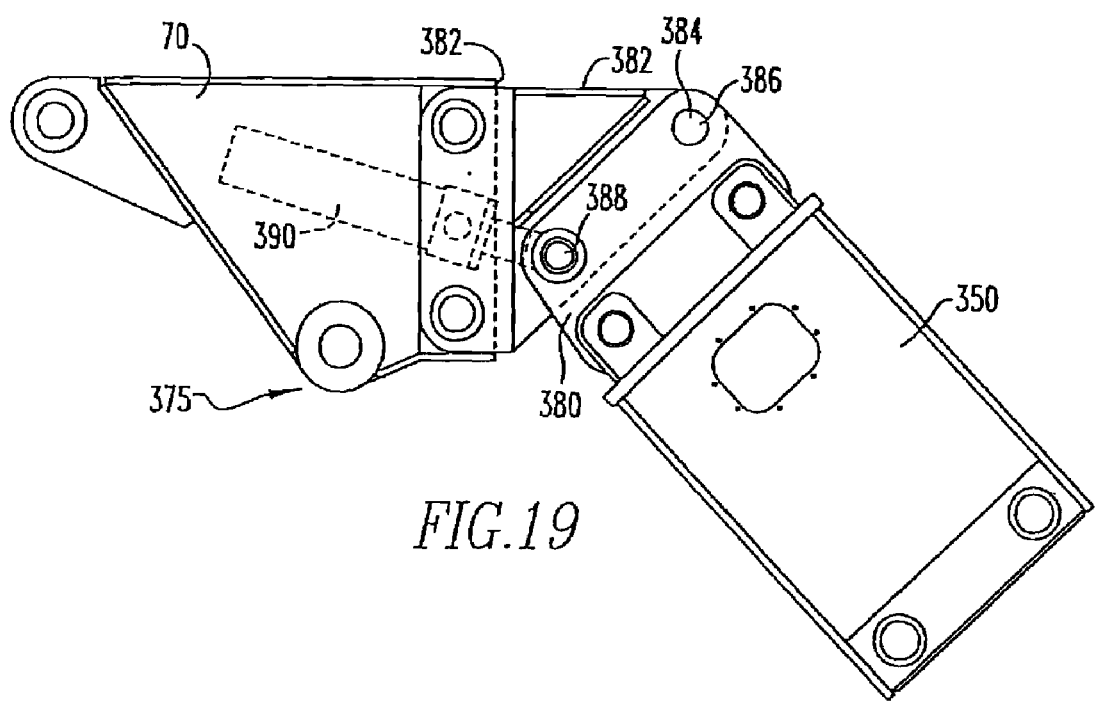
FIG. 19 is an assembled view of the exploded element in FIG. 18 excluding the multi-tool.

Directing attention to FIGS. 18 and 19, the folding module 375 is comprised of a two-part structure between the first end 377 and the second end 379. FIG. 18 illustrates the folding adapter 375 in a straight pattern, while FIG. 19 illustrates the folding adapter 375 in a folded configuration. A first part 380 and a second part 382 are connected at one point 384 by a pivot 386 and are connected at a different point 388 by a driving cylinder 390 with a cylinder rod 392 such that the motion of the cylinder rod 392 changes the angular orientation of the first part 380 relative to the second part 382 and, as a result, changes the angular orientation of the adapter 350 relative to the boom wing 70 or to any other module to which the first part 380 may be attached.

The arrangement illustrated in FIG. 18 and in FIG. 19 is a boom wing 70 attached to a folding module 375, which itself is attached to an adapter module 350. To conserve space and to minimize the number of parts, it is entirely possible to consolidate the boom wing 70 and the folding module 375, illustrated in FIGS. 18 and 19, to generate a folding adapter module 395, illustrated in FIGS. 20A and 20B. The folding adapter module 395 is comprised of a two-part structure, wherein the first part is an adapter part 397 similar to the adapter module 350 previously described, but now, as will be seen is an integral part of the folding adapter module 395. The adapter part 397 is at the module first end 409.

The folding adapter module 395 includes a first part 407 which has an adapter at the module first end 409 and includes similar features to the adapter module 350 described with respect to FIGS. 14A-14C. In particular, the first part 407 at the first end 409 includes a sleeve 401 with a longitudinal axis 403 and a passageway 405 extending therethrough along the longitudinal axis 403. The sleeve 401 is adapted to overlap a hydraulic cylinder portion 362 (FIG. 15) on the end of a tool 360.

The second part is a folding member 411. The first part 407 and the second part 411 are connected to one another at one point 484 by a pivot 486 and at a different point 488 by a driving cylinder 490 with a cylinder rod 492 such that motion of the cylinder rod 492 changes the angular orientation of the first part 407 relative to the second part 411 and, as a result, changes the angular orientation of the boom wing 70 and the first end 409.

Figure 20A:
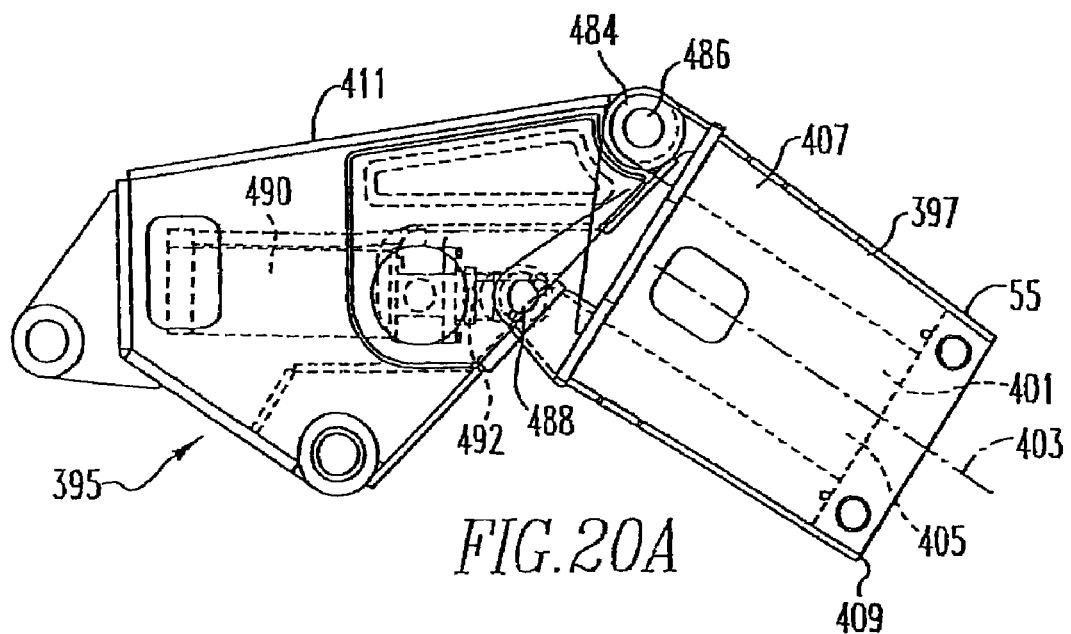
FIGS. 20A and 20B are side views of a folding adapter, in different positions, in accordance with the subject invention, whereby the folding member and the adapter member are integral with one another.
Figure 20B:
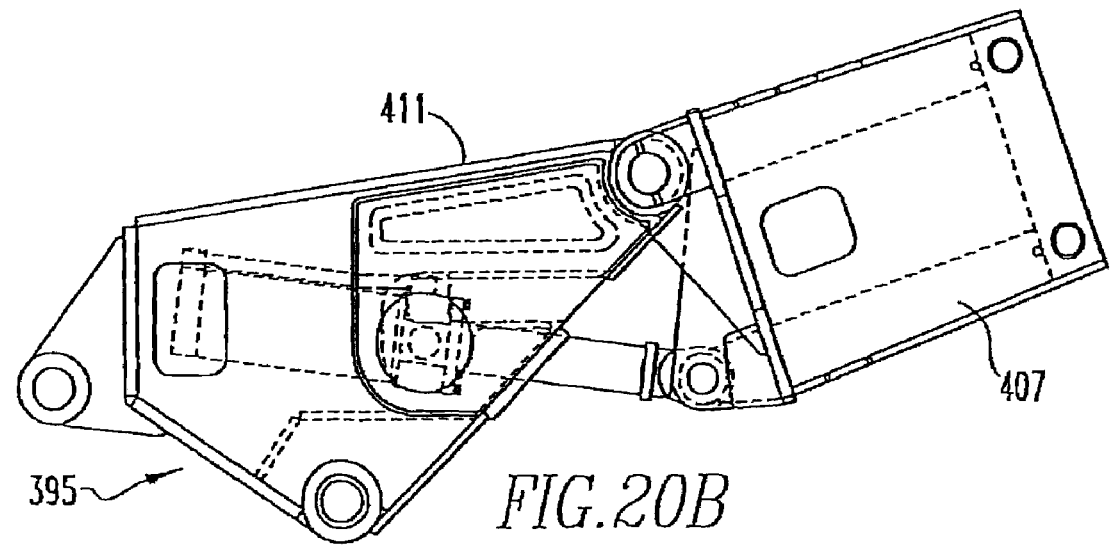
Figure 20C:
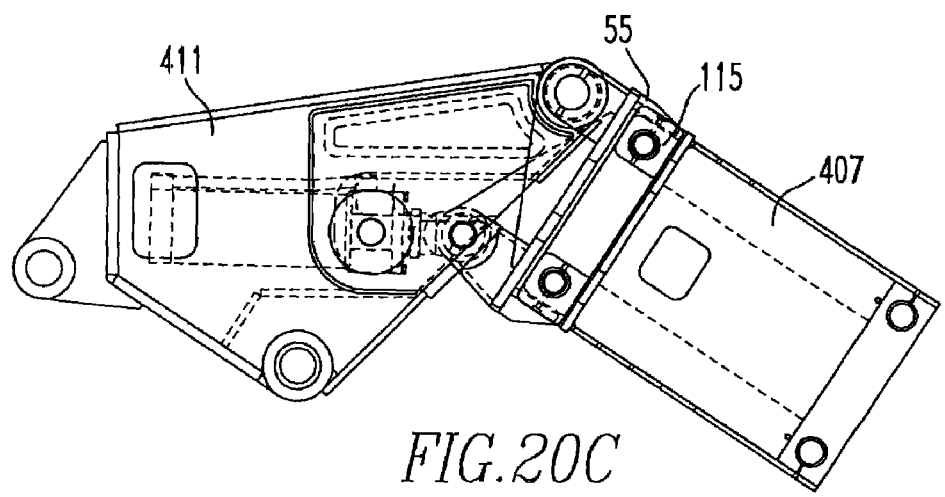
FIGS. 20C and 20D are side view of the folding module and adapter module illustrated in FIGS. 20A and 20B but includes a removable coupling between the two parts.
Figure 20D:
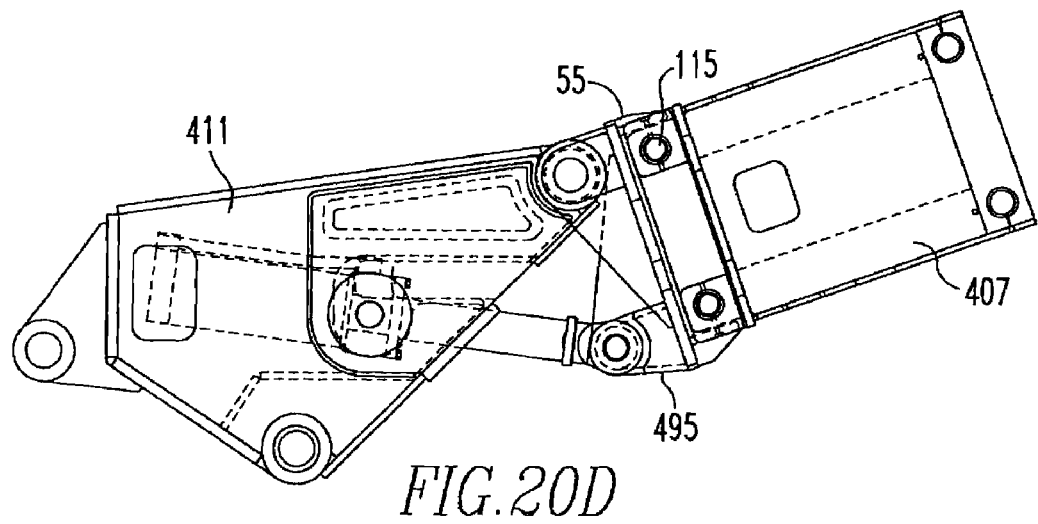
Figure 21C:
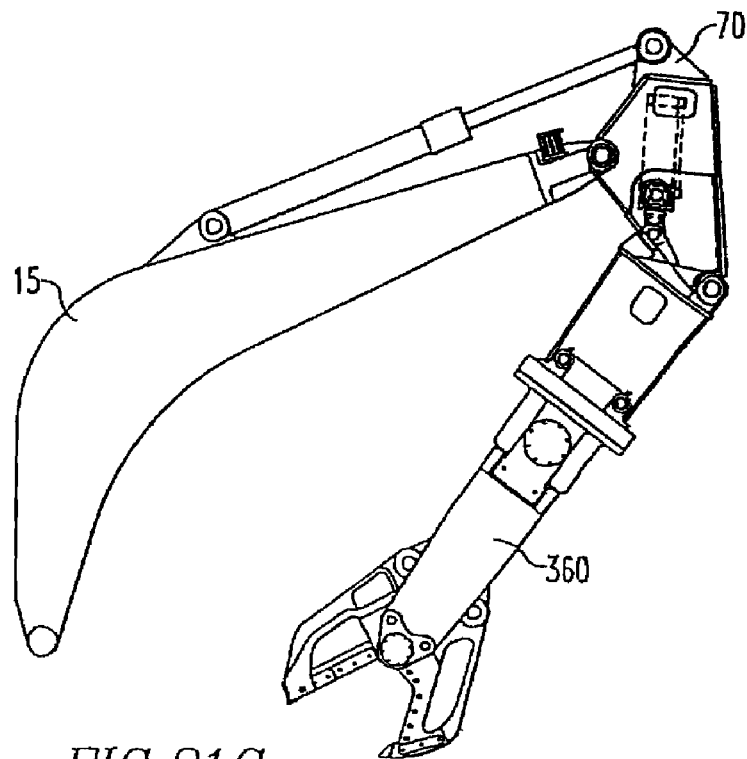
Figure 21D:
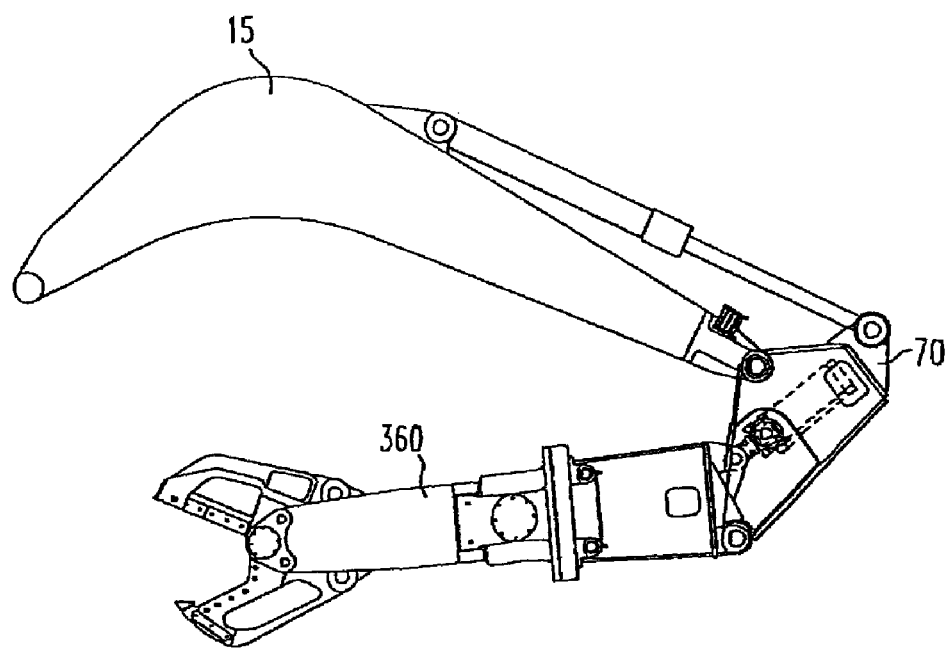

The folding adapter module 395 illustrated in FIGS. 20A and 20B is comprised of a first part 407, which is an adapter, and a second part 411, which is the folding member. FIGS. 20C and 20D illustrate a similar arrangement but with a standardized proximal coupling arrangement 55 associated with the folding member 411 adjacent to the first part 407. As a result, the first part 407, includes a standardized distal coupling arrangement 115 such that, in contrast to the arrangement in FIGS. 20A and 20B, the first part 407 may be easily secured to or removed from the folding member 411. This arrangement is similar to that shown in FIG. 19 except now the boom wing 70 (FIG. 19) and the second part 382 are unified as a single part. Additionally, with the standardized proximal coupling arrangement 55 on the folding member 411, in addition to the adapter 407, any of a variety of other members may be mounted to the folding member 411, as long as those members have a compatible standardized distal coupling arrangement 115.

FIGS. 21A-21D illustrate the versatility of a multi-tool 360 attached to a boom wing 70 by way of the folding adapter module 395 just described. Not only may the multi-tool 360 be rotated by the motion of the boom 15 as it is pivoted about the tractor (not shown), but additionally, through the use of the folding adapter module 395, the multi-tool 360 may have an additional joint of rotation such that, as illustrated in the sequence of FIGS. 20A-20C, the multi-tool 360 may be rotated through an angular range of approximately 135°. While such a rotation may be available utilizing a standard boom/stick combination, the space required for this arrangement coupled with a multi-tool 360 would be prohibitive and, as a result, the folding adapter module 395 provides a solution not heretofore available in previous designs.

The modular design so far discussed is amenable to both a terminal module with a standardized coupling arrangement at only one end or an intermediate module which includes a standardized proximal coupling arrangement on one end and a distal coupling arrangement on another end.

Returning attention to FIG. 16, the extension module 365 is one example of an intermediate module which, on a first end 369, includes a standardized proximal coupling 55 and, on the second end 371, includes a standardized distal coupling 115, such that the extension module 365 may be secured between two other modules having an identical distal coupling arrangement or proximal coupling arrangement. As illustrated in FIG. 16, the stick wing 50 includes a proximal coupling arrangement 55 which is secured to the distal coupling arrangement 115 at one end 371 of the extension module 365 while the proximal coupling arrangement 55 at the other end 369 of the extension module 365 is secured to the distal coupling arrangement 115 of the adapter module 350. As such, the adapter module 350 is also an intermediate module used to accommodate the multi-tool 360.

In order to accommodate the proximal coupling arrangement 55 of the adapter module 350, the multi-tool 360 has a front end 500 (FIG. 15) with a standardized proximal coupling arrangement 115 with the hydraulic cylinder portion 362 extending therefrom. As previously mentioned, the tool adapter 350 includes a sleeve 401 (FIG. 14B) with a longitudinal axis 403 and a passageway 405 extending therethrough along the longitudinal axis 403. The sleeve 401 overlaps the hydraulic cylinder portion 362 (FIG. 15) and has a standardized proximal coupling arrangement 55 secured to the standardized distal coupling arrangement 115 of the multi-tool 360. In this arrangement, the multi-tool 360, since it has only a standardized distal coupling arrangement 115, is considered to be a terminal module. On the other hand, the tool adapter 350, since it has both a standardized proximal coupling arrangement 115 and a standardized distal coupling arrangement 55, is considered to be an intermediate module.

An intermediate module may also be the extension module 365 previously discussed with respect to FIG. 16. An intermediate module may furthermore be the folding module 375 discussed with respect to FIGS. 17 and 18. Additionally, an intermediate module may be the folding adapter module 395 discussed with respect to FIGS. 19-20B.

Figure 23:
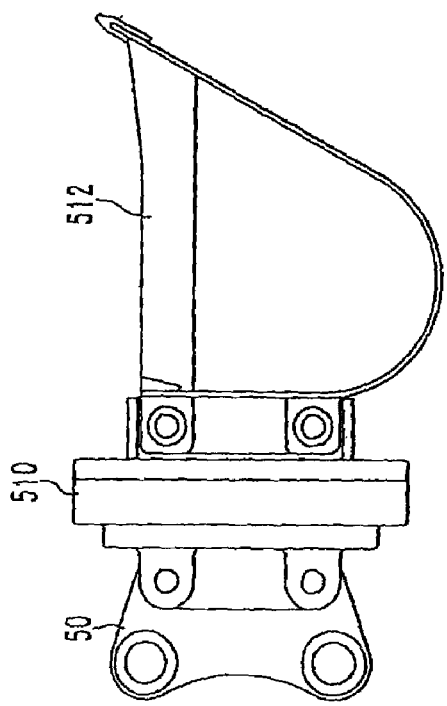
FIG. 23 is a side view of the arrangement illustrated in FIG. 22 but in an assembled configuration.
Figure 22:
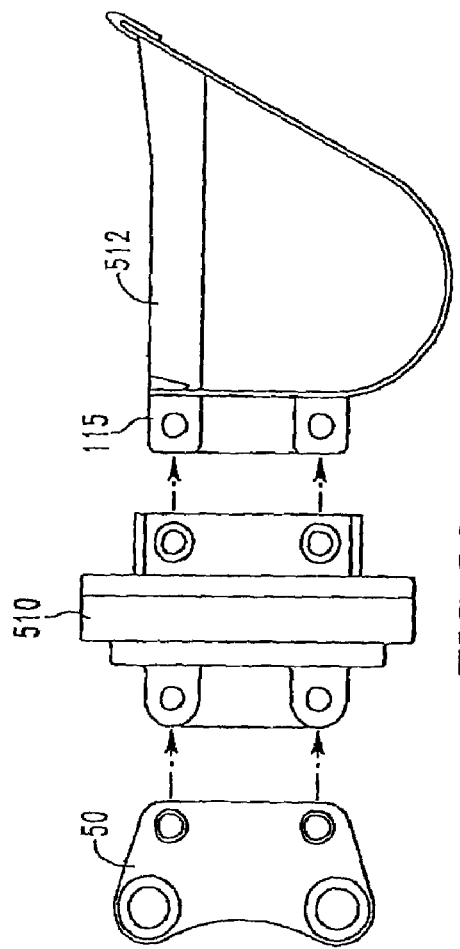
FIG. 22 is an exploded side view of a bucket associated with a stick wing and a rotator module therebetween.

Directing attention to FIGS. 22 and 23, the intermediate module may also be a rotator module 510 that may, for example, be secured between the stick wing 50 and a bucket 512 having a distal coupling arrangement 115 thereupon. FIG. 23 illustrates this arrangement assembled.

Figure 26:
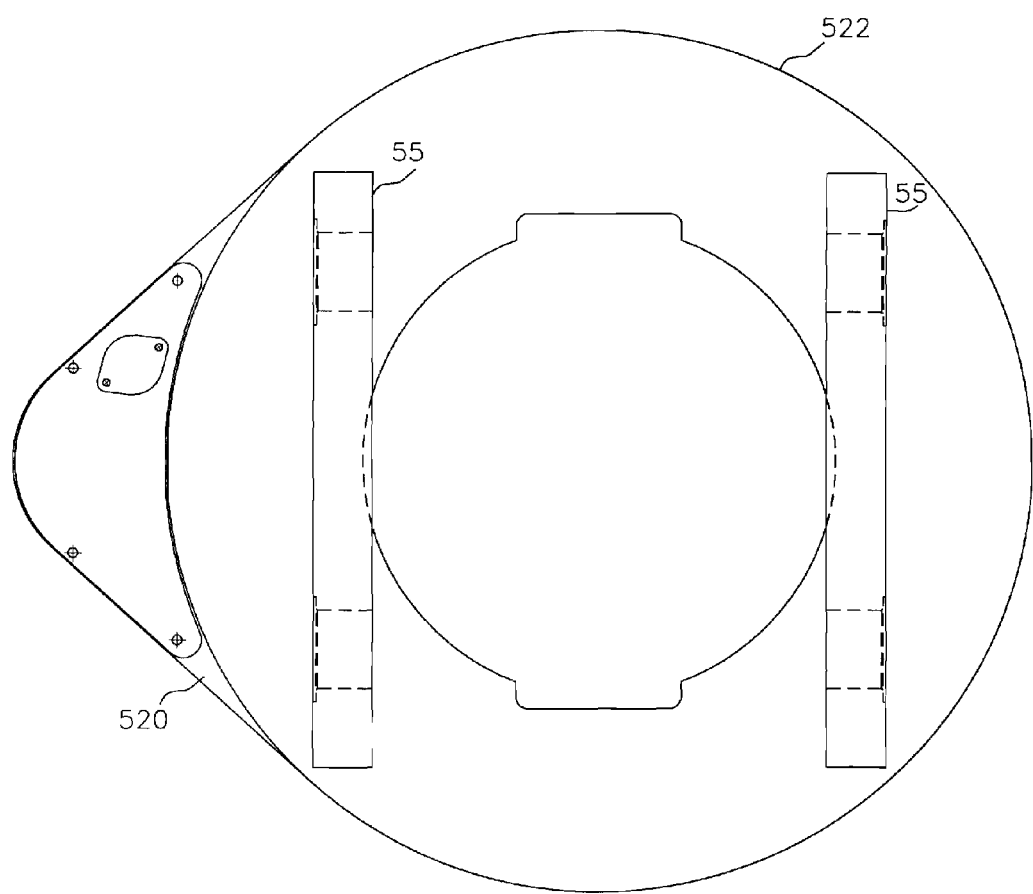

Directing attention to FIGS. 24-26, the rotator module 510 is comprised of a rotator 514 between a first end 516 and a second end 518. The rotator 514 is comprised of a first part 520 rotatably connected to a second part 522 and further includes a driver 524 to mechanically rotate the first part 520 relative to the second part 522, thereby providing rotation between the module first end 516 and the module second end 518. The driver 524 rotates a driver gear which mates with an engaging gear to provide relative rotation between the first part 520 and the second part 522. The driver 524 may be a hydraulically driven motor or, in the alternative, may be an electric motor. The rotator module has a standardized distal coupling arrangement 115 at the first end 516 and a standardized proximal coupling arrangement 55 at the second end 518.

Figure 28:
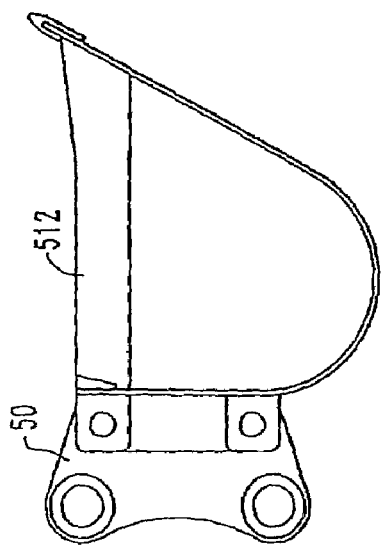
FIG. 28 is a side view of an assembled configuration of the elements in FIG. 27.
Figure 27:
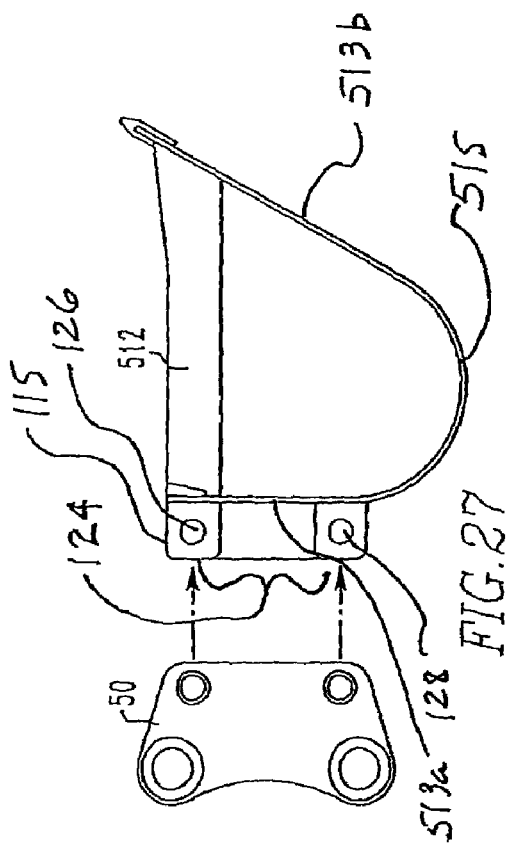
FIG. 27 is an exploded side view similar to that of FIG. 22, however, without the rotator module between the stick wing and bucket.

Although FIGS. 22 and 23 illustrated a bucket 512 secured to the stick wing 50 through a rotator module 510, as illustrated in FIGS. 27 and 28, it is entirely possible to mount the bucket 512 directly to the stick wing 50.

Figure 30:
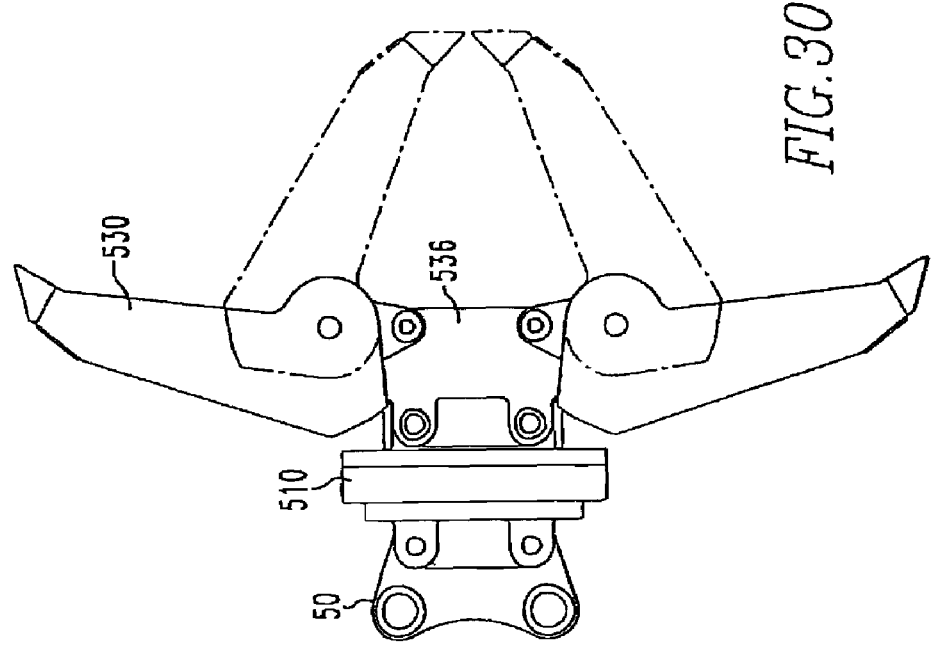
FIG. 30 is a side view of the arrangement in FIG. 29, but in an assembled configuration.
Figure 29:
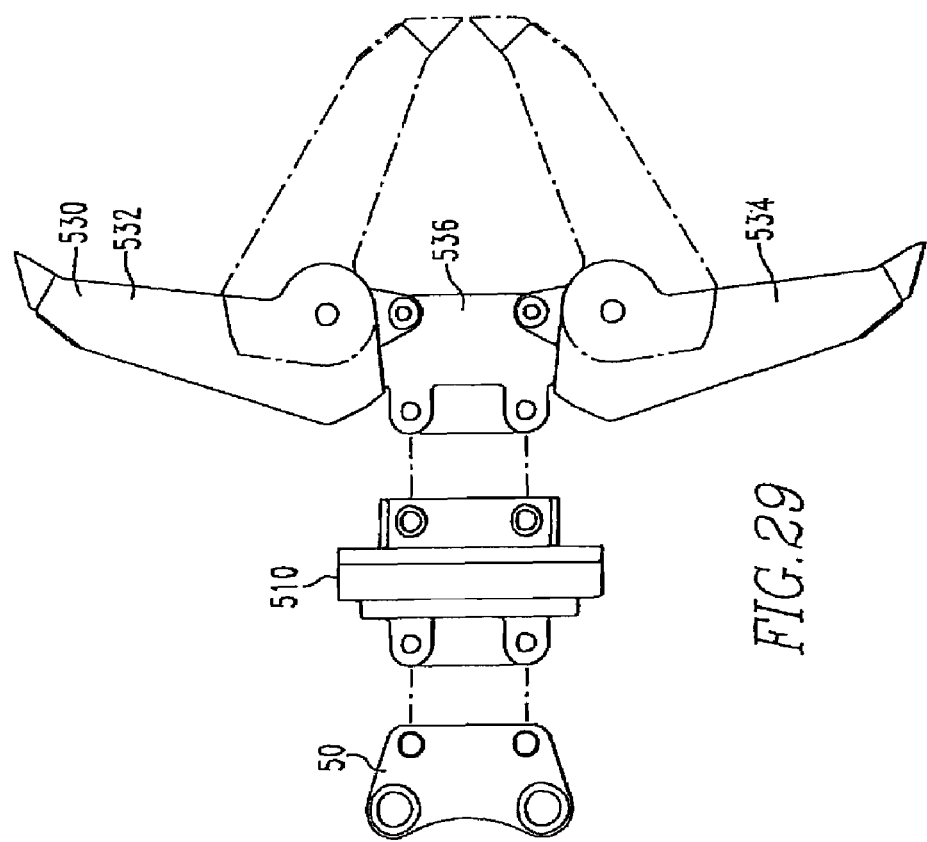
FIG. 29 is an exploded side view of a claw associated with a stick wing.
Figure 36:
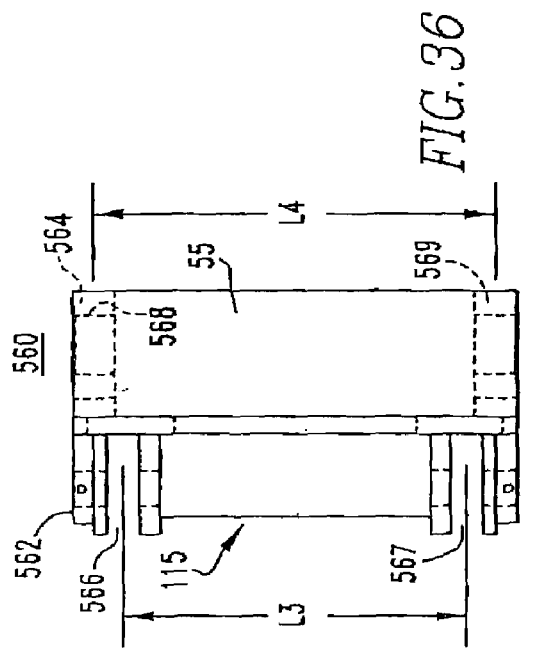
FIGS. 35 and 36 are a side view and a top view of an enlarger module.
Figure 35:
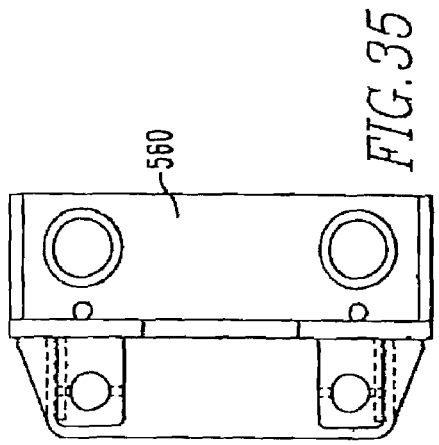

FIGS. 29 and 30 illustrate an exploded and an assembled view of a claw 530 secured to the stick wing 50 through a rotator module 510. The claw 530 may be comprised of two tines 532, 534 pivotally secured to the body 536 of the claw and operated by hydraulic cylinders (not shown).

FIGS. 31 and 32 illustrate a hammer 540 secured to the stick wing 50 in a typical manner discussed within this application. Depending upon the manufacturer of the hammer, 540, it may be necessary to install a fitting plate 542 which includes a distal coupling arrangement 115 similar to those discussed herein. With such an arrangement, the hammer 540 may be mounted via the stick wing 50 to the stick 20 of a construction machine. Note the hydraulic cylinder 40 (FIG. 2) has been removed in FIG. 32.

As previously stated, while a module having a proximal coupling arrangement on one end and a distal coupling arrangement on the opposing end has been referred to as an intermediate module, a module having only a standardized distal coupling arrangement at one end may be referred to as a terminal module. In particular, the multi-tool 360 (FIG. 15) may be considered a terminal module as may the bucket 512 (FIG. 27), claw 530 (FIG. 29), and hammer 540 (FIG. 31).

Note the bucket 512 in FIGS. 22-23, 27-28 is comprised of opposing side walls 513a, 513b and a curved bottom 515 connecting the side walls 513a, 513b. The standardized distal coupling 115 is mounted directly to the side wall 513a of the bucket 512. The shape of the bucket 512 in conjunction with the standardized distal coupling 115 mounted directly to the side wall 513a permits the center of gravity of the bucket 512 to be closer to the proximal distal coupling 115, thereby reducing the overhang of the bucket 512 relative to the construction machine. In particular, the hole pattern 156 (FIG. 7A) has holes 126, 128 along a line parallel to the side wall 513a of the bucket 512.

Figure 34:
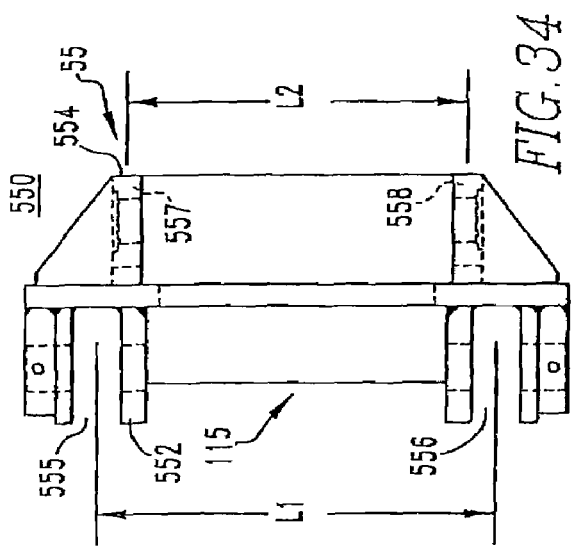
FIGS. 33 and 34 are a side view and a top view, respectively, of a reducer module.
Figure 33:
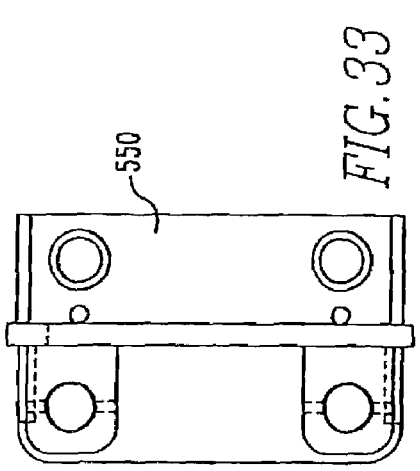

What has so far been discussed are proximal coupling arrangements and distal coupling arrangements all compatible with one another. Such arrangements may typically be associated with a construction machine having a specific design capacity. However, it is entirely possible, depending upon the intended loading of a construction machine, to mate a coupling arrangement of one size with a coupling arrangement of a different size. In particular and with attention directed to FIGS. 33 and 34, a reducer module 550 is comprised of a first end 552 having a distal coupling arrangement 115 and a second end 554 having a proximal coupling arrangement but proportionately smaller to accommodate a proximal coupling arrangement also proportionately smaller for an adjacent module. In particular, the distance between slots in the distal coupling arrangement 115 is L1 and the distance between the center lines of the protrusions 557, 558 for the proximal coupling arrangement 55, which normally would extend within the slots 555, 556, is L2 which, as illustrated in FIG. 34, is less than L1.

In the alternative, an enlarger module 560 may have a first end 562 with a distal coupling arrangement having a distance between slots 566, 567 of L3 with a second end 564 having a distance L4 between protrusions 568, 569, wherein L4 is greater than L3, and the standardized proximal coupling arrangement 55 is proportionately smaller than the standardized distal coupling arrangement 115.

It should be noted that the size and the spacing of the mounting holes for each adapter will also change depending on the size of the coupling arrangement.

Figure 37A:
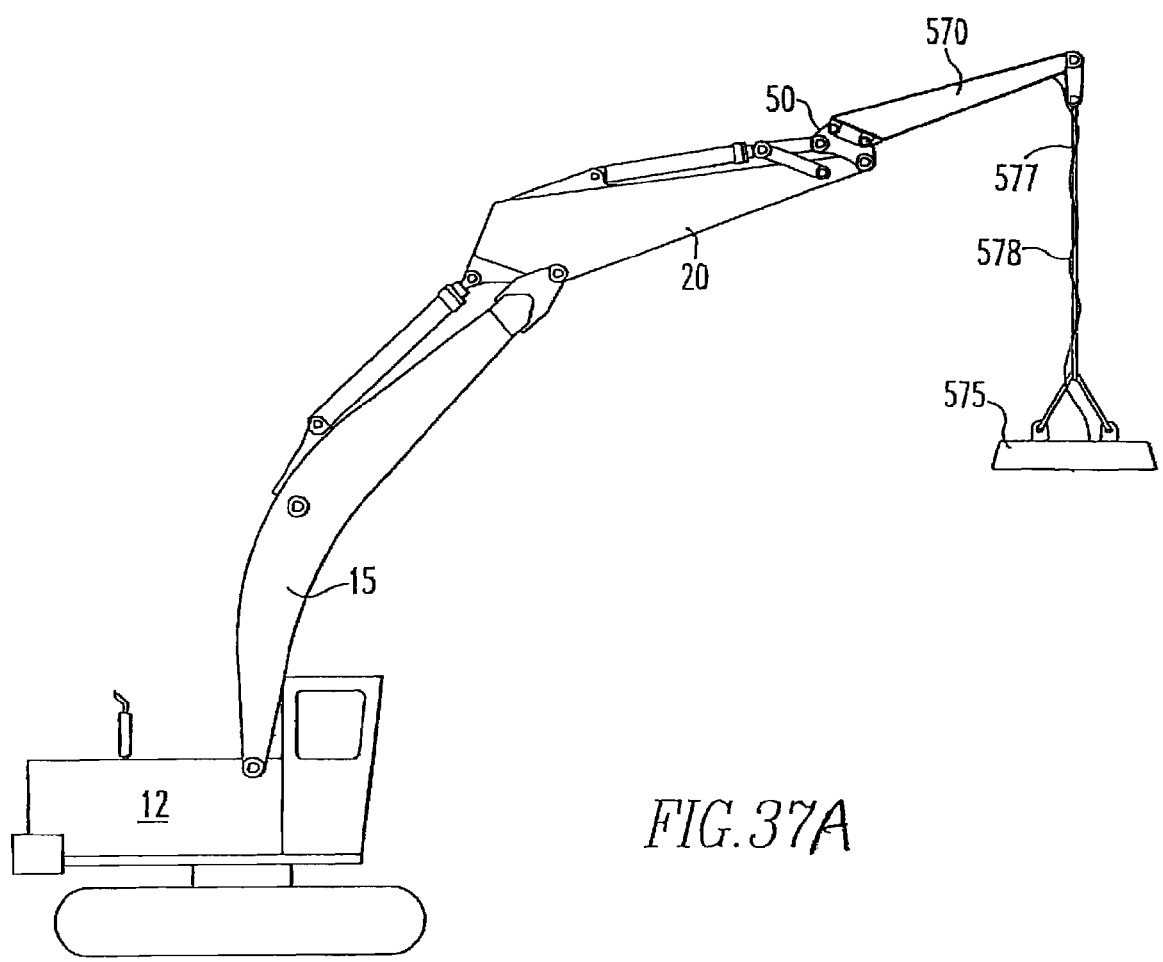
FIG. 37A is a schematic of a construction machine, whereby a supplemental extension arm has been added to the stick for a system designed to be utilized with an electric magnet for retrieving scrap.

FIG. 37A illustrates a construction machine 12 with a boom 15 and a stick 20 with a stick wing 50 attached thereto and a supplemental extension arm 570 attached to the wing 50. An electric magnet 575 is suspended by cables 577 from the supplemental extension arm 570. The electric magnet must be powered by an electric cable 578 extending all of the way from the tractor 12 to the magnet 575 and, as a result, the electrical cable 578 is exposed not only to the motion of the boom 15 and the stick 20, but furthermore, is exposed to the environment which may include demolition debris contacting or severing the electrical cable 578.

The supplemental extension arm 570 is illustrated in FIGS. 38A and 38B and includes a first window 585 providing an entrance to the internal frame and a second window 587 providing an exit from the internal frame, thereby protecting the electrical cable 578 along the length of the supplemental extension arm 570. By doing so, the electrical cable 578 powering the magnet 575 is shielded along the segments of the construction machine where the cable 578 would normally be most vulnerable. The supplemental extension arm 570 has lifting slots 572, 573 extending therethrough suitable to accept the tines of a forklift or suitable to accept a cable sling for lifting and the standardized distal coupling 115, as illustrated in FIG. 38B, may be oriented at a non-perpendicular angle A relative to the longitudinal axis I. extending along the length of the arm 570.

In a design similar to that to be discussed with respect to FIGS. 40A and 40B, the supplemental extension arm 570, as illustrated in FIG. 39B, may also have a standardized distal coupling 115 oriented at an angle A perpendicular to the longitudinal axis L.

Figure 37B:
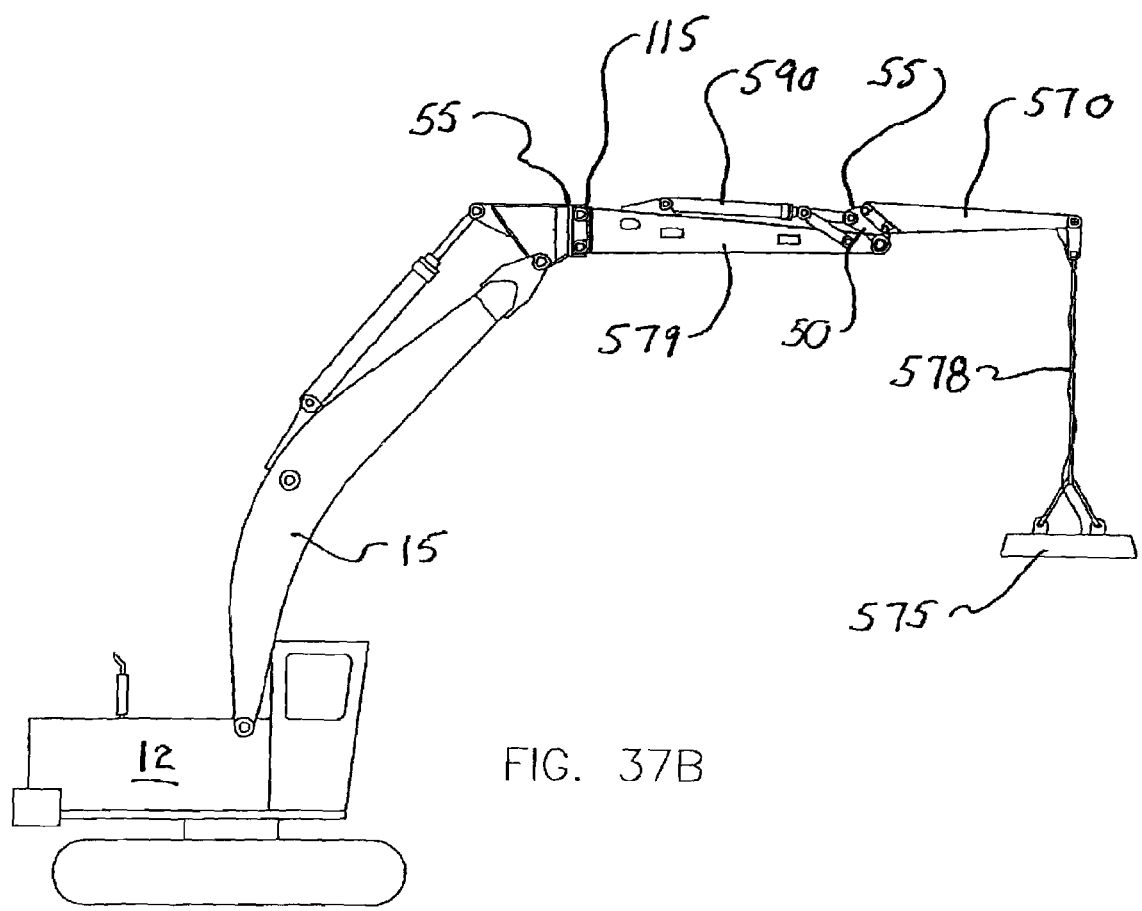
FIG. 37B is a schematic of a construction machine, whereby a modified stick has been added in place of the stick illustrated in FIG. 37A.

FIG. 37B illustrates an arrangement similar to that arrangement in FIG. 37A, except now the stick 20 has been replaced by a modified stick 579. The modified stick 579 is similar to the stick 20 previously described with the addition of the standardized distal coupling 115. The modified stick 579, also illustrated in FIG. 40A, may include a first window 581, which provides access to the internal frame of the modified stick 579 to protect the electrical cable, and a second window 583, which together provide an entrance point and an exit point for the electrical cable 578. A hydraulic cylinder 590 is mounted to the modified stick 579 and the standardized proximal coupling 55, in the form of the stick wing 50, is pivotally coupled to the hydraulic cylinder 590. As illustrated in FIG. 40A, the standardized distal coupling 115 of the modified stick 579 may be oriented at an angle A perpendicular to a longitudinal axis L extending along the length of the modified stick 579. By providing a standardized distal coupling 115, which forms a perpendicular angle with the longitudinal axis L, it is possible to flip the modified stick 579 so that the hydraulic cylinder 590 is on the bottom of the configuration as opposed to the arrangement in FIGS. 37B and 40A, with the hydraulic cylinder 590 on the top. As a result, the modified stick 579 may be oriented so that the hydraulic cylinder 590 is on the top or the bottom of the configuration to provide improved performance depending upon whether the modified stick 570 is used to push down on (cylinder on top) or lift (cylinder on bottom) an object. By design, hydraulic cylinders are designed to provide their greatest forces when the piston is extended from the cylinder housing. While the hydraulic cylinder 590 is illustrated on the top of the modified stick 579, the appearance of the modified stick 579 flipped with the hydraulic cylinder 590 on the bottom may be easily envisioned.

The modified stick 579 in FIG. 40B is identical to that illustrated in FIG. 40A and presented in the earlier figures with the exception that now the standardized distal coupling 115 is oriented at a non-perpendicular angle A relative to the longitudinal axis L.

Figure 37C:
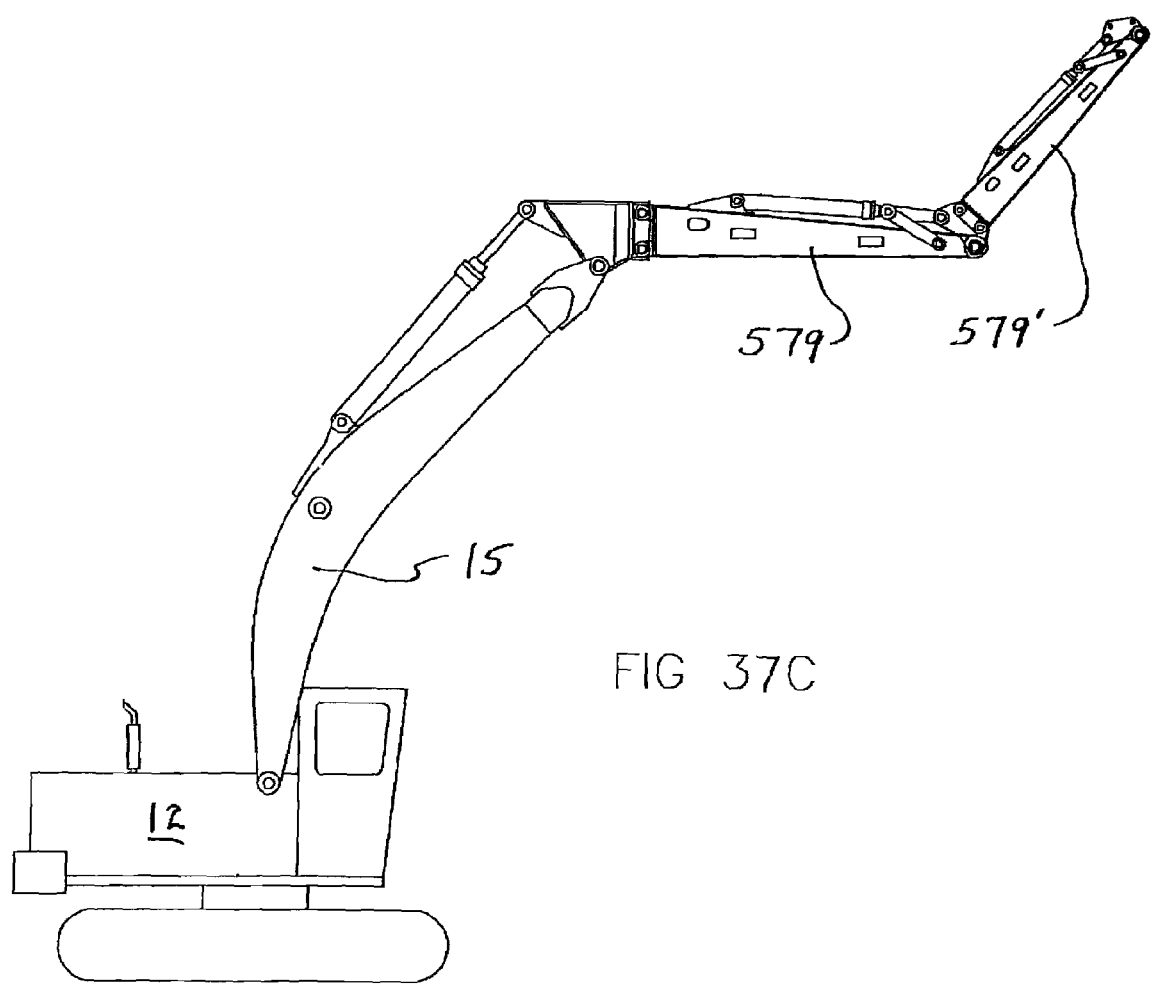
FIG. 37C is a schematic of a construction machine, whereby a second modified stick has been added in place of the supplemental extension arm illustrated in FIG. 37B.
Figure 41A:
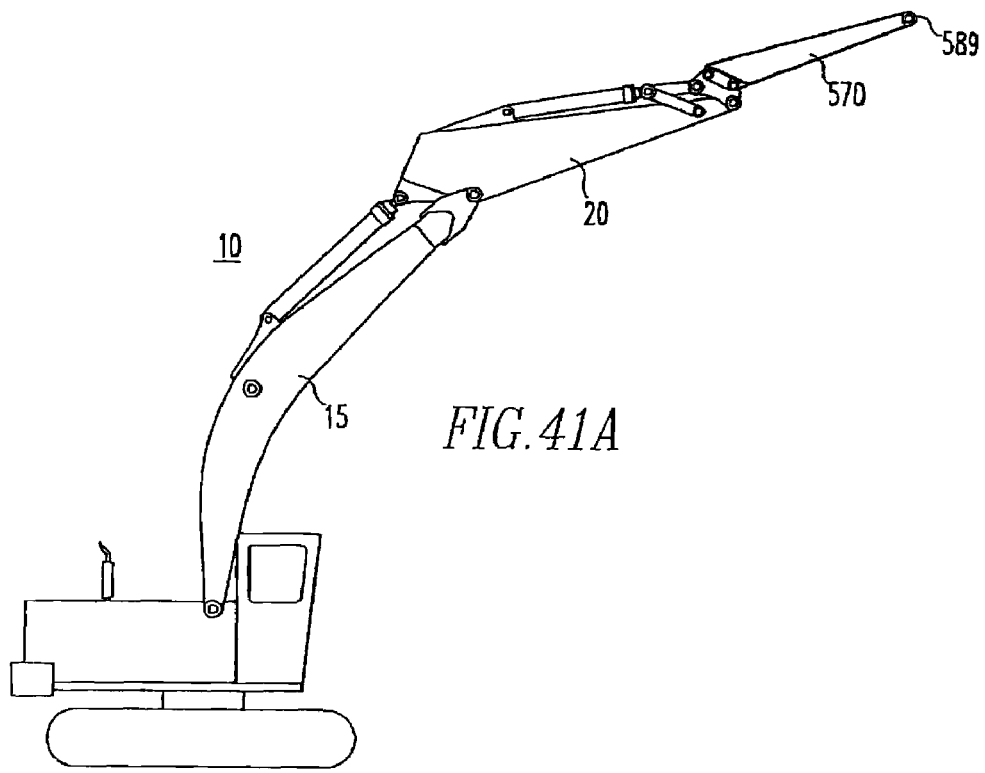
FIGS. 41A-41E illustrate a sequence of motion possible utilizing the elements illustrated on the construction machine in FIG. 37A.
Figure 41B:
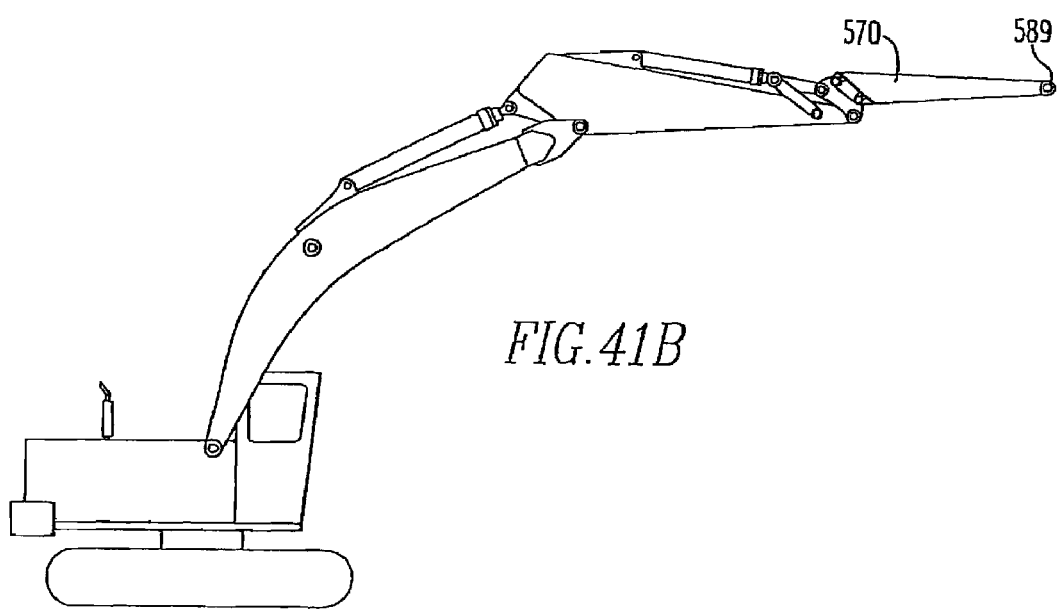
Figure 41C:
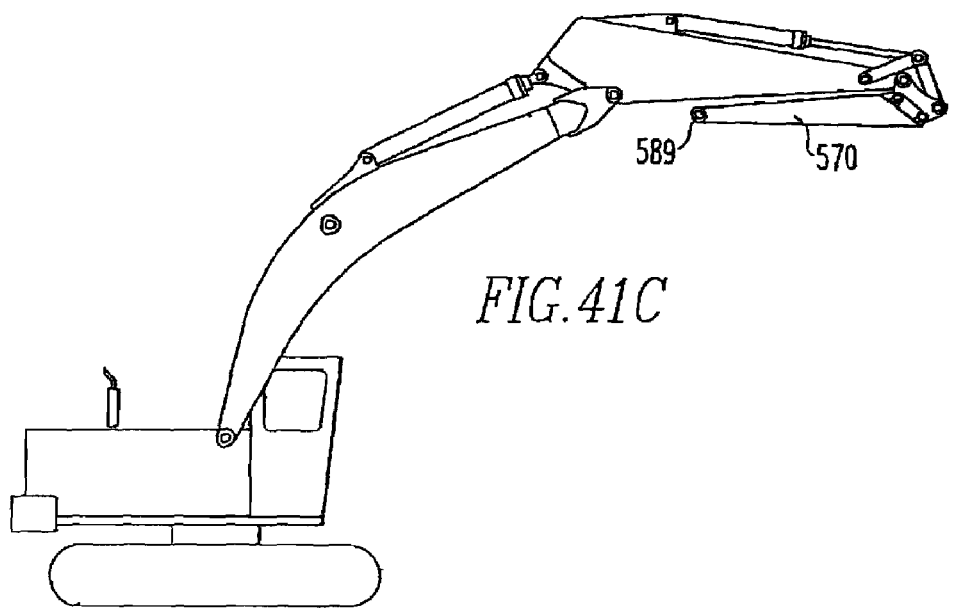
Figure 41D:
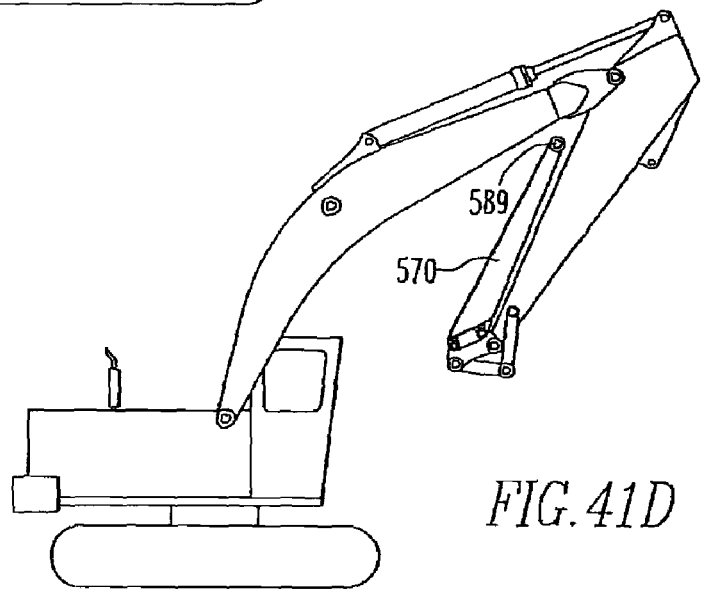
Figure 41E:
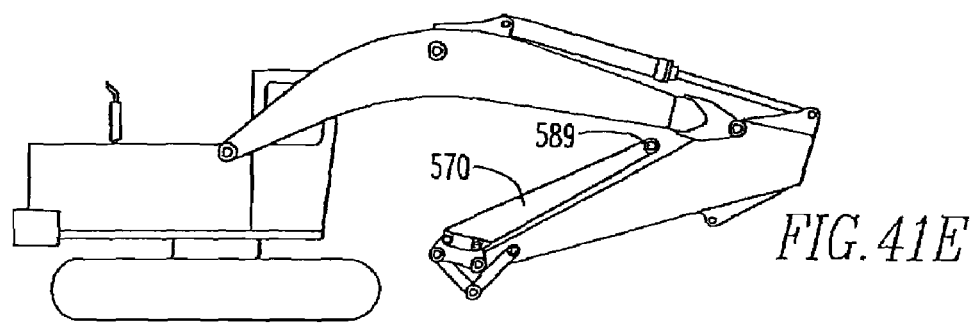

FIG. 37C illustrates an arrangement, whereby a first modified stick 579 may be secured to a second modified stick 579'. While the second modified stick 579' may be identical to the first modified stick 579, it may be preferred for the second modified stick 579' to be smaller than the first modified stick 579. However, in principle, multiple modified sticks may be attached to one another to provide extension to a given machine.

FIGS. 41A-41E illustrate the versatility of a construction machine 10 having a hydraulically activated boom 15, a hydraulically activated stick 20, and a hydraulically activated supplemental extension arm 570. As may be seen in the sequence presented in FIGS. 41A-41E, the end 589 of the supplemental extension arm 570 is capable of being rotated 360°. Such a range of motion provides a machine operator with tremendous flexibility and versatility.

Figure 42:
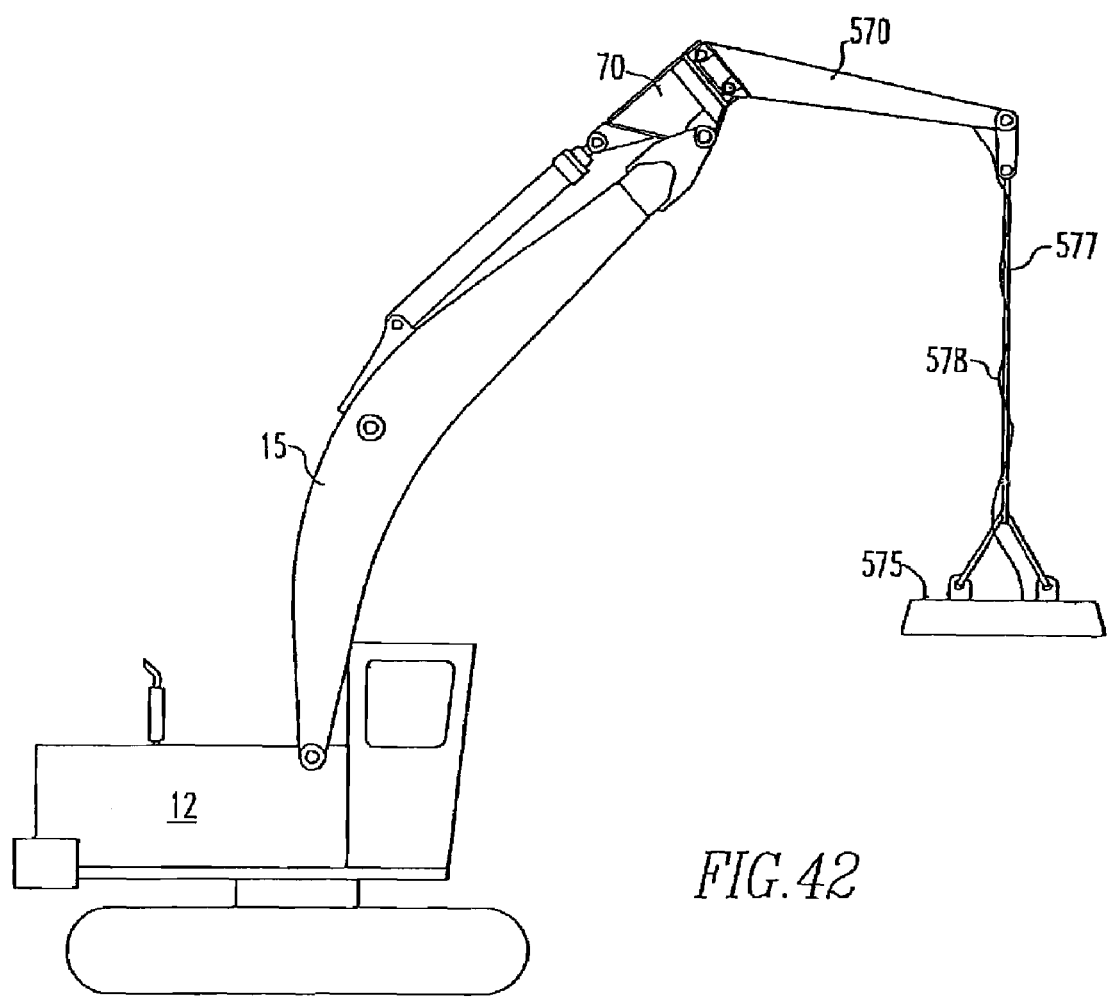
FIG. 42 is a schematic of a construction machine, whereby the supplemental extension member has been added to the boom for a system designed to be utilized with an electric magnet for retrieving scrap.

FIG. 42 illustrates a construction machine 12 with a boom 15 and a boom wing 70 attached thereto. The supplemental extension arm 570 is connected to the boom wing 70. Attached to the supplemental extension arm 570, through a support cable 577, is an electric magnet 575 powered by an electric cable 578. Therefore, it should be apparent that the supplemental extension arm 570 having an electric magnet 575 attached thereto may be secured to either the stick wing 50, as illustrated in FIG. 37, or the boom wing 70, as illustrated in FIG. 42.

Figure 43A:
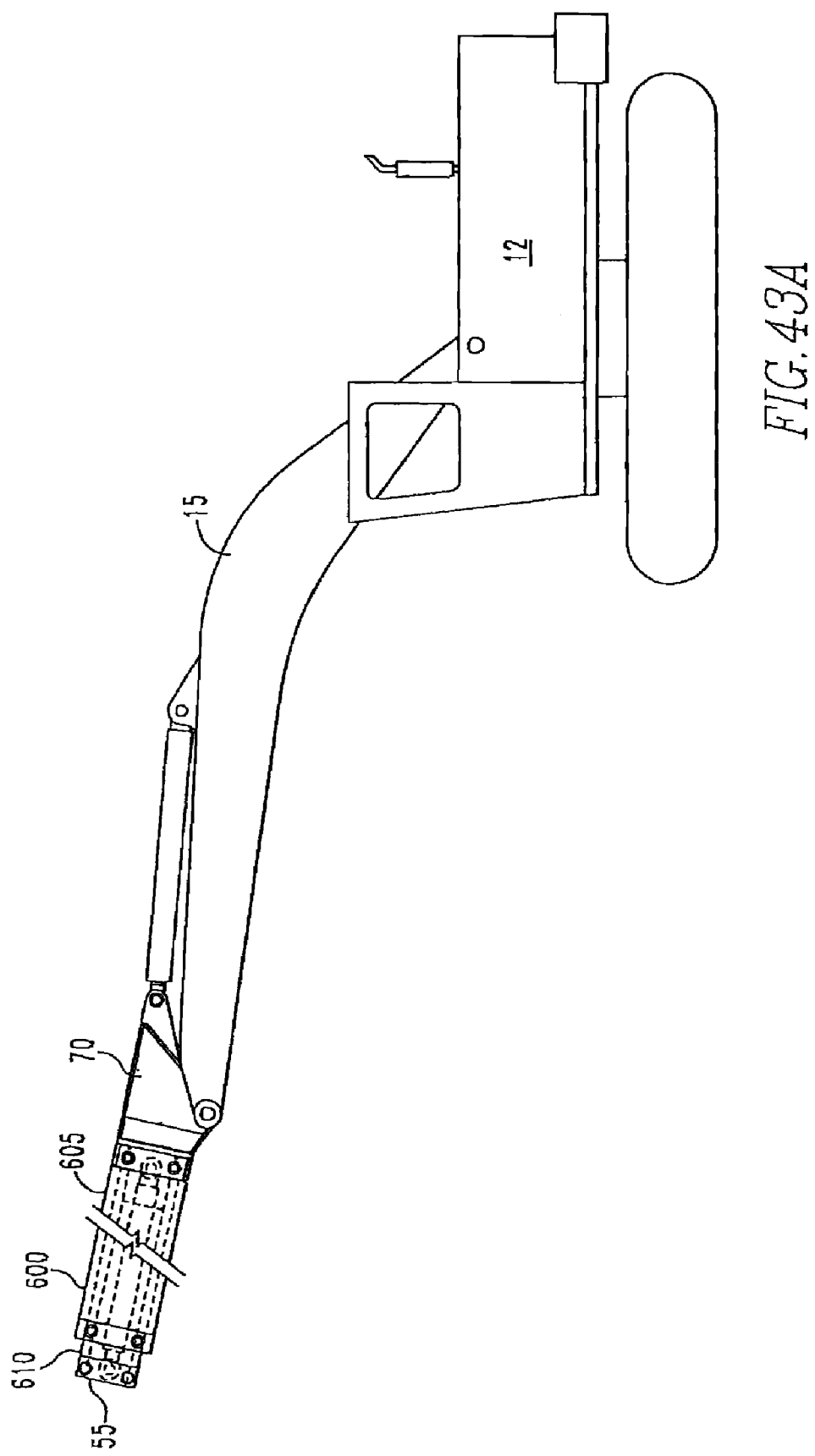
Figure 43B:
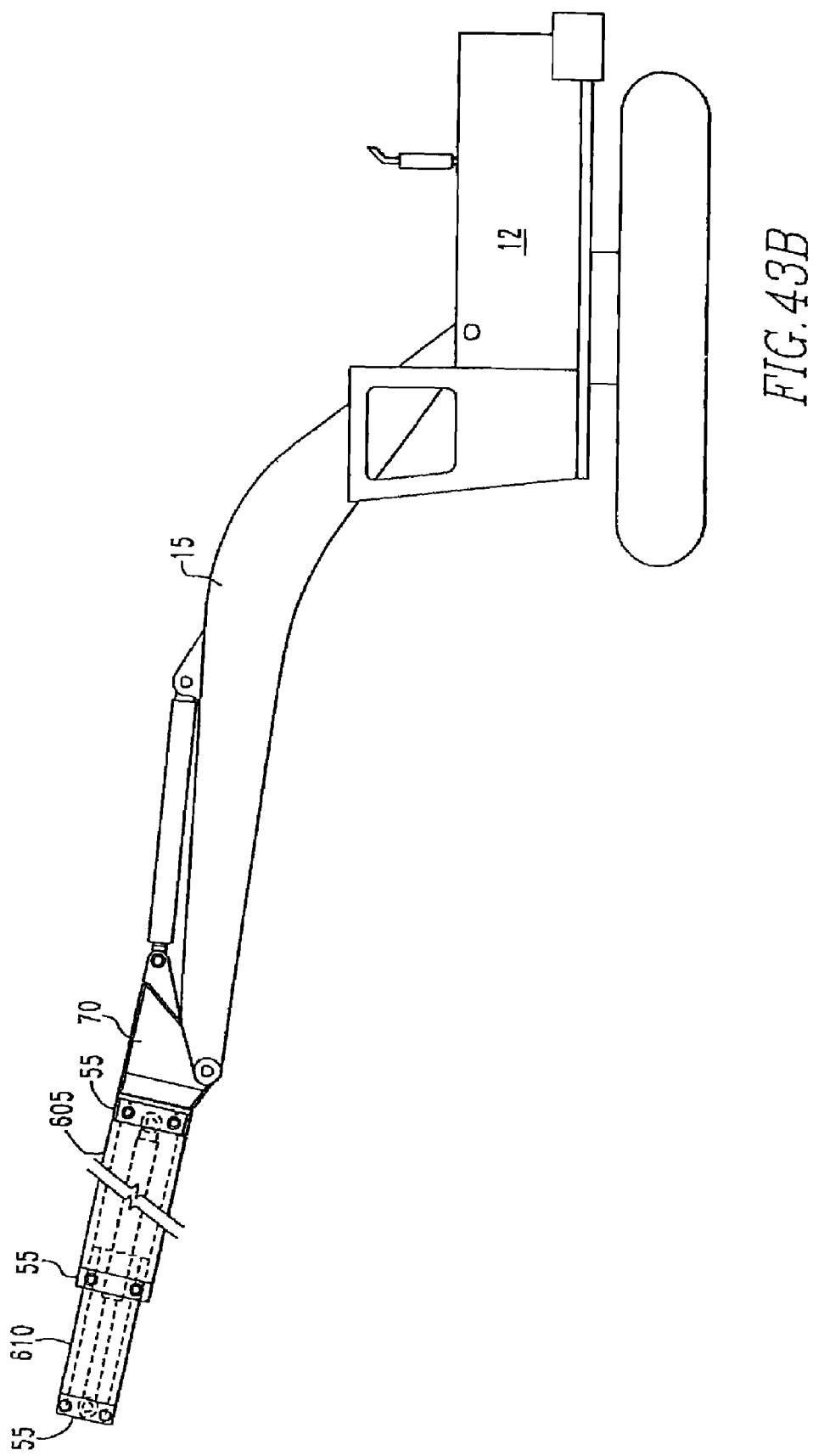

FIGS. 43A-43C illustrate a telescopic adapter module 600 secured to the boom wing 70 of a construction machine 12. It should be appreciated that the telescopic adapter module 600 may also be mounted to a stick wing (not shown) or one of the intermediate adapters previously discussed herein.

The telescopic adapter module 600 is comprised of a base 605 with an axially moving nested segment 610 extending from the base 605. As can be seen in FIGS. 43A-43B, multiple nesting segments are possible. In particular, FIG. 43C illustrates a second nested segment 615 extending from the first nested segment 610. At the furthermost end of nested segment 615 is a standardized proximal coupling arrangement 55 of a particular size. A central cylinder 620 may be activated to extend the segments 610, 615 from the base 605. In one embodiment of the subject invention, nested segment 615 is the only segment that includes the standardized proximal coupling arrangement 55. However, in another embodiment, the base 605 includes a standardized proximal coupling arrangement 55 of one size, the first nested segment 610 includes a standardized proximal coupling arrangement 55 of another size and, as mentioned, the second nested segment 615 includes yet another standardized proximal coupling arrangement 55 of yet another size. As a result, the telescopic adapter module 600 functions not only as a telescoping unit, but furthermore, provides the versatility to connect any number of different sized standardized distal coupling arrangements to the telescopic adapter module. As seen in FIG. 43C, the standardized proximal coupling arrangement 55 becomes progressively smaller in each segment 610, 615 extending away from the base 605. The embodiment illustrated in FIGS. 43A-43C includes two nested segments 610, 615 extending from a base 605, wherein the furthermost end of each segment 610, 615 has a standardized proximal coupling arrangement 55.

The subject invention is also directed to a method of interchanging one module with another module to provide versatility to a construction machine. In particular, and with attention directed to FIGS. 22-23, the rotator module 510 may be secured between the stick wing 50 and the bucket 512 with the standardized coupling arrangements mating with one another. Additionally, with attention directed to FIGS. 27-28, the bucket 512 may be attached directly to the stick wing 50. As a result, it should be apparent that the modules described throughout this application may be attached in any number of combinations to provide configurations desired by the machine owner. It is also possible to remotely lock and unlock these modules to one another by aligning the hole patterns between a standardized distal coupling arrangement and a standardized proximal coupling arrangement and securing retention pins through the matching holes as described herein.

Figure 48:
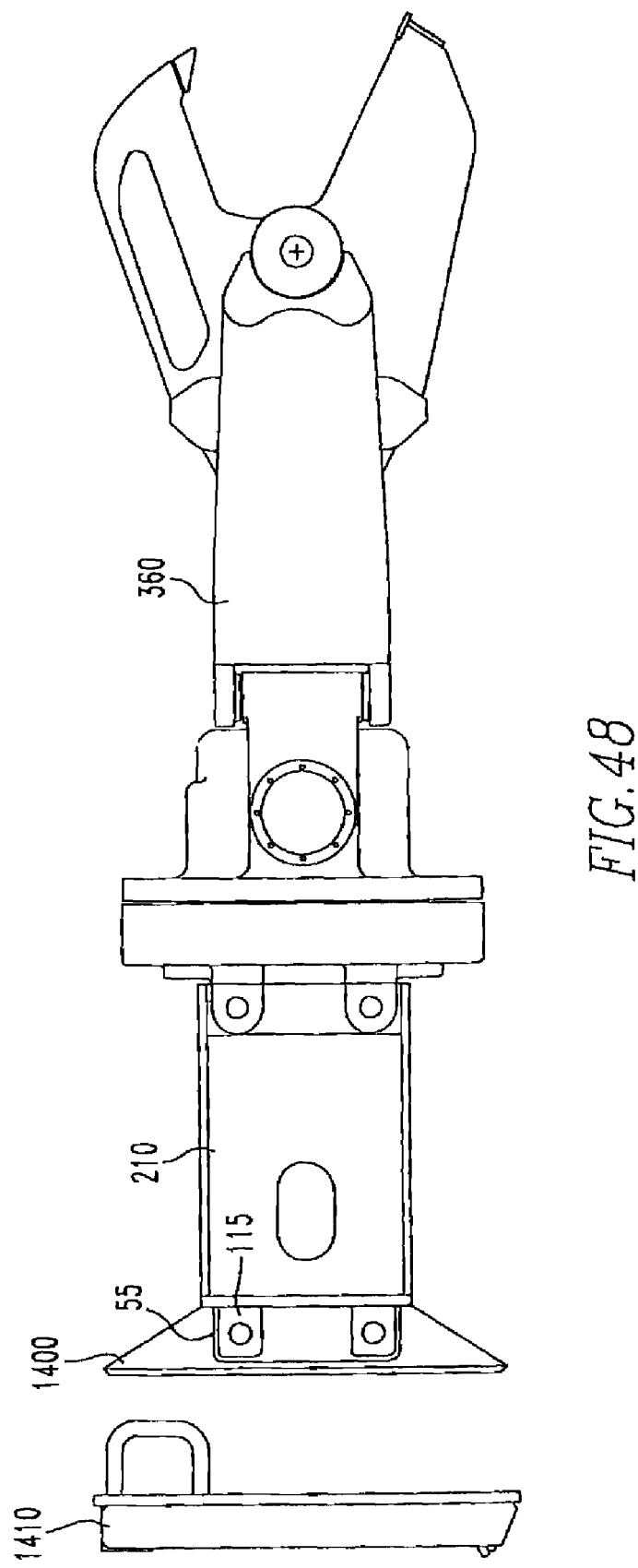
FIG. 48 is a side view of a multi-tool secured to a universal adapter plate suited for mounting upon a skid steer.
Figure 49:
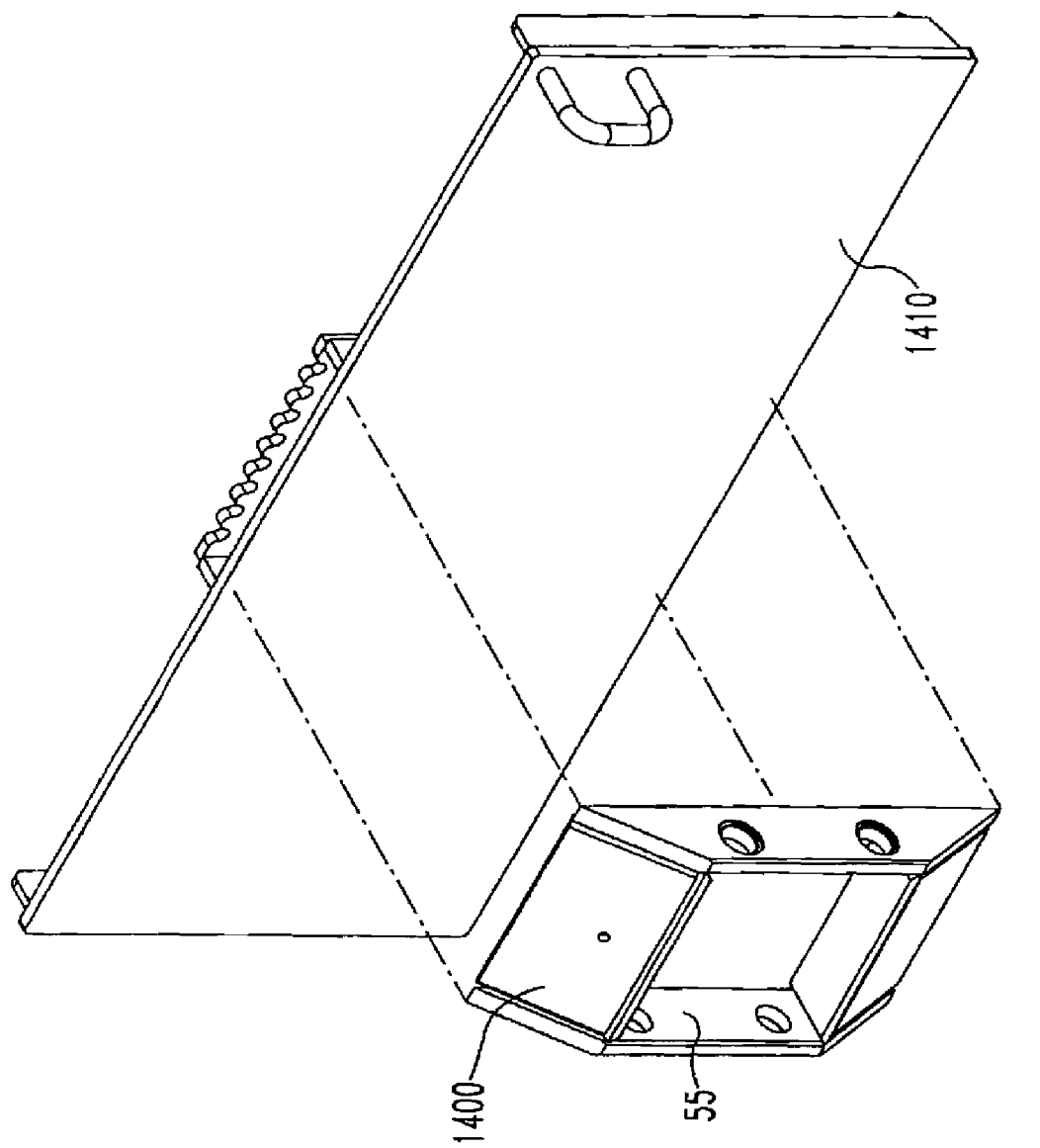
FIG. 49 is a perspective view of the universal adapter plate illustrated in FIG. 48.

The arrangements discussed so far have been directed to the members having one or both of the standardized proximal coupling and a standardized distal coupling associated with a relatively large construction machine. Directing attention to FIGS. 48-49, a universal adapter plate 1400 which includes a standardized proximal coupling arrangement 55 may be secured to a mounting plate 1410 suitable, for example, for mounting upon a skid steer loader (not shown). As a result, multi-tool 360 secured to an adapter 210, which has a standardized distal coupling arrangement 115, may be secured to the mounting plate 1410. It should be appreciated that the mounting plate 1410 may be configured for attachment to any number of different machines or tools. In such a fashion, the versatility provided by the system described herein may be utilized on other construction equipment, such as the skid steer loader.

It should now be appreciated that the system, in accordance with the subject invention, provides tremendous versatility for using the intermediate modules and the terminal modules to assemble from the stick or the boom of a construction machine and almost limitless number of different combinations to accommodate the needs of a machine operator since all of the intermediate modules and the terminal modules are compatible with one another through the standardized coupling arrangements.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A modular system for connecting any one of a plurality of modules to an extension arm of a construction machine comprising:
   a) a wing secured to the end of the extension arm, wherein the wing at an end opposite the extension arm has a standardized proximal mounting arrangement with a pair of spaced-apart parallel plates;
   b) a first plurality of modules, wherein each module has a first end adapted to be secured to the wing and comprises a standardized distal coupling arrangement adapted to be coupled with the standardized proximal coupling arrangement so that each module may be interchangeably secured to the wing;
   c) wherein each of the pair of wing plates associated with the proximal mounting arrangement is positioned adjacent to one of the pair of module plates associated with the distal mounting arrangement;
   d) at least one common mating hole extends through each wing plate and the adjacent module plate; and
   e) a pin adapted to slide into each of the at least one mating holes to restrict translation of the wing plate and the module plate relative to one another in a direction parallel to the plates;
   f) wherein the module is an intermediate module which further includes a second end comprising a standardized distal coupling arrangement such that the module at the first end has a standardized proximal coupling and at the second end has a standardized proximal coupling arrangement, wherein the intermediate module may be secured between two other modules having an identical distal coupling arrangement or proximal coupling arrangement; and
   g) wherein the intermediate module is a modified stick having a longitudinal axis and a hydraulic cylinder mounted to the stick and wherein the standard proximal coupling is pivotally attached to hydraulic cylinder.

2. The system according to claim 1, wherein the standardized distal coupling of the modified stick is oriented at a non-perpendicular angle relative to the longitudinal axis.

3. The system according to claim 1, wherein the standardized distal coupling of the modified stick is oriented at an angle perpendicular to the longitudinal axis.

4. The system according to claim 3, wherein the modified stick is adapted to be mounted with the hydraulic cylinder on either the top or on the bottom of the stick.

5. A stick for use on a construction machine, wherein the stick has a longitudinal axis and a hydraulic cylinder mounted to the stick, wherein the stick is comprised of:
   a) a standardized proximal coupling on a first end, wherein the standardized proximal coupling has a pair of spaced-apart parallel plates;
   b) a standardized distal coupling on a second end, wherein the standardized distal coupling has a pair or spaced-apart parallel plates;

c) wherein the standardized proximal coupling and the standardized distal coupling are complimentary such that a second module having an identical one of the standardized proximal coupling with a pair of spaced-apart parallel plates or the standardized distal coupling with a pair of spaced-apart parallel plates may be secured thereto; and d) wherein the standardized proximal coupling has at least one mating hole that extends through each of the pair of standardized proximal coupling plates and, wherein the standardized distal coupling has at least one mating hole that extends through each of the pair of standardized distal coupling plates adapted to other similar couplings with at least one pin extending through common mating holes;

e) such that the stick may be connected to other sticks or to other members having compatible standardized couplings, wherein the standardized proximal coupling is attached to the hydraulic cylinder such that the standardized proximal coupling is pivotally attached to the stick.

6. The stick according to claim 5, wherein the standardized distal coupling forms a perpendicular angle with the longitudinal axis.

7. An adapter plate having a generally planar first side adapted to be mounted to the front of a skid steer loader and a second side having a standardized proximal coupling to accept the standardized distal coupling of attachments associated with a multi-tool, a) wherein the standardized proximal coupling has a pair of spaced-apart parallel plates, wherein the parallel plates extend along a line perpendicular to the generally planar first side;

b) at least one mating hole extending through each parallel late and adapted to be mated with at least one mating hole extending through each of a pair of spaced-apart parallel plates of a standardized distal coupling of an attachment; and c) a pin adapted to slide into each of the at least one mating holes of the standardized proximal coupling and the standardized distal coupling to restrict translation of the adapter plate and attachment relative to one another in a direction parallel to the plates.

8. A modular system for connecting any one of a plurality of modules to an extension arm of a construction machine comprising:

a) a wing secured to the end of the extension arm, wherein the wing at an end opposite the extension arm has a standardized proximal mounting arrangement with a pair of spaced-apart parallel plates;

b) a first plurality of modules, wherein each module has a first end adapted to be secured to the wing and comprises a standardized distal coupling arrangement with a pair of spaced-apart parallel plates adapted to be coupled with the standardized proximal coupling arrangement so that each module may be interchangeably secured to the wing;

c) wherein each of the pair of wing plates associated with the proximal mounting arrangement is positioned adjacent to one of the pair of module plates associated with the distal mounting arrangement;

d) at least one common mating hole extends through each wing plate and the adjacent module plate; and e) a pin adapted to slide into each of the at least one mating holes to restrict translation of the wing plate and the module plate relative to one another in a direction parallel to the plates;

f) wherein the module is a bucket with a standardized distal coupling arrangement; and g) wherein the standardized distal coupling is mounted directly to a side wall of the bucket.

9. The system according to claim 8, wherein the bucket has two opposing side walls and a curved bottom and, wherein the standardized distal coupling has a hole pattern along a line parallel to the side wall of the bucket to which it is attached.

10. A bucket for use with a modular system for connecting to one of a plurality of modules of a construction machine, wherein the bucket comprises:

a) two side walls and a bottom connecting the side walls; and b) a wing secured to one side wall, wherein the wing has a standardized distal coupling with a pair of spaced-apart parallel plates with a hole pattern, wherein the pair of parallel plates extends along a line perpendicular to the side wall of the bucket;

c) at least one mating hole extending through each wing parallel plate and adapted to be mated with at least one mating hole extending through each of a pair of spaced-apart parallel plates of a standardized proximal coupling of the module; and d) a pin adapted to slide into each of the at least one mating holes of the standardized distal coupling and the standardized proximal coupling to restrict translation of the wing and the module relative to one another in a direction perpendicular to the plates.

11. A modular system for connecting any one of a plurality of modules to an extension arm of a construction machine comprising:

a) a wing secured to the end of the extension arm, wherein the wing at an end opposite the extension arm has a standardized proximal mounting arrangement with a pair of spaced-apart parallel plates;

b) a first plurality of modules, wherein each module has a first end adapted to be secured to the wing and comprises a standardized distal coupling arrangement with a pair of spaced-apart parallel plates adapted to be coupled with the standardized proximal coupling arrangement so that each module may be interchangeably secured to the wing;

c) wherein each of the pair of wing plates associated with the proximal mounting arrangement is positioned adjacent to one of the pair of module plates associated with the distal mounting arrangement;

d) at least one common mating hole extends through each wing plate and the adjacent module plate; and e) a pin adapted to slide into each of the at least one mating holes to restrict translation of the wing plate and the module plate relative to one another in a direction parallel to the plates;

f) wherein each module is an intermediate module which further includes a second end comprising a standardized distal coupling arrangement such that the module at the first end has a standardized proximal coupling and at the second end has a standardized proximal coupling arrangement, wherein the intermediate module may be secured between two other modules having an identical distal coupling arrangement or proximal coupling arrangement;

g) wherein the intermediate module is a folding module comprised of a two-part structure between the first end and the second end with a first part and a second part connected at one point by a pivot and at a different point by a hydraulic cylinder such that motion of the cylinder changes the angular orientation of the first part relative to the second part; and h) a boom wing secured directly to the second end of the folding module.

12. The system according to claim 11, wherein the intermediate module is a folding adapter module for securing to a multi-tool, wherein the multi-tool has a front end with a standardized proximal coupling arrangement and a hydraulic cylinder extending therefrom, wherein the folding adapter is comprised of:

a) an adapter having a sleeve with a longitudinal axis and a passageway extending therethrough along the longitudinal axis, wherein the sleeve overlaps the hydraulic cylinder and has a standardized distal coupling arrangement, and wherein the standardized distal coupling arrangement is secured to a standardized proximal coupling arrangement on the multi-tool;

b) a folding member attached to the adapter, wherein the folding member is comprised of a two-part structure between the first end and the second end with a first part connected to the adapter and also connected to a second part, wherein the first part and second parts are connected to one another at one point by a pivot and at a different point by a driving cylinder such that motion of the cylinder changes the angular orientation of the first part relative to the second part and as a result, changes the angular orientation of the adapter and the second part; and c) between the folding member and the adapter, a standardized proximal coupling arrangement associated with the folding member and a standardized distal coupling arrangement associated with the adapter, such that the folding member and the adapter may be releasably secured to one another.

13. A module for connecting to the extension arm of a construction machine, wherein the module is comprised of:

a) a body with a first end and a second end with a proximal coupling arrangement associated with the first end and a distal coupling arrangement associated with the second end;

b) wherein the distal coupling arrangement is comprised of a pair of spaced-apart parallel plates with a hole pattern and the proximal coupling arrangement is comprised of a mating pair of spaced-apart parallel plates with an aligned matching hole pattern;

c) wherein the mounting arrangements are complimentary such that a second module having an identical one of the distal mounting arrangement with a pair of spaced-apart parallel plates or proximal mounting arrangement with a pair of spaced-apart parallel plates may be secured thereto;

d) wherein the proximal coupling arrangement has at least one mating hole that extends through each of the pair of plates and, wherein the distal coupling arrangement has at least one mating hole that extends through each of the pair of plates adapted to other similar couplings with at least one pin extending through common mating holes;

e) wherein the module is a folding module comprised of a two-part structure between the first end and the second end with a first part and a second part connected at one point by a pivot and at a different point by a hydraulic cylinder such that motion of the cylinder changes the angular orientation of the first part relative to the second part; and f) a boom wing secured directly to the second end of the folding module.

14. A module for connecting to the extension arm of a construction machine, wherein the module is comprised of:

a) a body with a first end and a second end with a proximal coupling arrangement associated with the first end and a distal coupling arrangement associated with the second end;

b) wherein the distal coupling arrangement is comprised of a pair of spaced-apart parallel plates with a hole pattern and the proximal coupling arrangement is comprised of a mating pair of spaced-apart parallel plates with an aligned matching hole pattern;

c) wherein the mounting arrangements are complimentary such that a second module having an identical one of the distal mounting arrangement with a pair of spaced-apart parallel plates or proximal mounting arrangement with a pair of spaced-apart parallel plates may be secured thereto;

d) wherein the proximal coupling arrangement has at least one mating hole that extends through each of the pair of plates and, wherein the distal coupling arrangement has at least one mating hole that extends through each of the pair of plates adapted to other similar couplings with at least one pin extending through common mating holes e) wherein the module is a folding adapter module comprised of a two-part structure, wherein 1) the first part is an adapter at the module first end having a sleeve with a longitudinal axis and a passageway extending therethrough along the longitudinal axis, wherein the sleeve is adapted to overlap a hydraulic cylinder on the end of a tool;

2) the second part is a folding member; and 3) wherein the first part and second part are connected to one another at one point by a pivot and at a different point by a driving cylinder with a cylinder rod such that motion of the cylinder rod changes the angular orientation of the first part relative to the second part and as a result, changes the angular orientation of the first part to the second part; and f) between the folding member and the adapter, a standardized proximal coupling arrangement associated with the folding member and a standardized distal coupling arrangement associated with the adapter, such that the folding member and the adapter may be releasably secured to one another.

15. A modular system for connecting any one of a plurality of modules to an extension arm of a construction machine comprising:

a) a wing secured to the end of the extension arm, wherein the wing at an end opposite the extension arm has a standardized proximal mounting arrangement with a pair of spaced-apart parallel plates;

b) wherein each of the pair of wing plates associated with the proximal mounting arrangement is positioned adjacent to one of the pair of module plates associated with the distal mounting arrangement;

c) at least one common mating hole extends through each wing plate and the adjacent module plate; and d) a pin adapted to slide into each of the at least one mating holes to restrict translation of the wing plate and the module plate relative to one another in a direction parallel to the plates;

e) a supplemental extension arm having a longitudinal axis and a standardized proximal coupling on a first end such that the arm may be connected to other members having a compatible standardized coupling, wherein the standardized proximal coupling may be pivotally attached to the other members.

16. The system according to claim 15, wherein the standardized distal coupling of the supplemental extension arm stick is oriented at a non-perpendicular angle relative to the longitudinal axis.

17. The system according to claim 15, wherein the standardized distal coupling of the supplemental extension arm is oriented at an angle perpendicular to the longitudinal axis.

18. A supplemental extension arm for use on a construction machine, wherein the supplemental extension arm comprises:
   a) a longitudinal axis and a standardized proximal coupling on a first end, wherein the standardized proximal coupling has a pair of spaced-apart parallel plates with a hole pattern and, wherein the pair of parallel plates extends along a line parallel to the longitudinal axis;
   b) at least one mating hole extending through each extension arm parallel plate and adapted to be mated with at least one mating hole extending through each of a pair of spaced-apart parallel plates of a standardized distal coupling of a module; and
   c) a pin adapted to slide into each of the at least one mating holes of the standardized proximal coupling and the standardized distal coupling to restrict translation of the extension arm and the module relative to one another in a direction parallel to the plates, such that the extension arm may be connected to other modules having a compatible standardized distal coupling.

19. The supplemental extension arm according to claim 18, wherein the standardized distal coupling of the supplemental extension arm is oriented at a non-perpendicular angle relative to the longitudinal axis.

20. The supplemental extension arm according to claim 18, wherein the standardized distal coupling of the supplemental extension arm is oriented at a perpendicular angle to the longitudinal axis.

* * * * *

UNITED STATES PATENT AND TRADEMARK OFFICE
CERTIFICATE OF CORRECTION

| | |
|---|---|
| PATENT NO. | : 7,877,906 B2 |
| APPLICATION NO. | : 12/255314 |
| DATED | : February 1, 2011 |
| INVENTOR(S) | : Ramun |

It is certified that error appears in the above-identified patent and that said Letters Patent is hereby corrected as shown below:

Column 16, line 49, Claim 1, "attached to hydraulic cylinder" should read
-- attached to the hydraulic cylinder --

Column 16, line 66, Claim 5, "pair or spaced-" should read -- pair of spaced- --

Column 17, line 2, Claim 5, "complimentary" should read -- complementary --

Column 17, line 34, Claim 7, "late and adapted" should read -- plate and adapted --

Column 19, line 47, Claim 13, "complimentary" should read -- complementary --

Column 20, line 12, Claim 14, "complimentary" should read -- complementary --

Column 20, line 23, Claim 14, "mating holes e)" should read
-- mating holes;
e) wherein --

Signed and Sealed this
Seventeenth Day of May, 2011

David J. Kappos
*Director of the United States Patent and Trademark Office*